(12) United States Patent
Jacobs et al.

(10) Patent No.: US 7,359,105 B2
(45) Date of Patent: Apr. 15, 2008

(54) SPATIAL LIGHT MODULATOR AND A DISPLAY DEVICE

(75) Inventors: Adrian Marc Simon Jacobs, Reading (GB); Diana Ulrich Kean, Oxon (GB); David James Montgomery, Oxon (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/348,602

(22) Filed: Feb. 7, 2006

(65) Prior Publication Data

US 2007/0183015 A1 Aug. 9, 2007

(51) Int. Cl.
| | |
|---|---|
| G02F 1/03 | (2006.01) |
| G02F 1/133 | (2006.01) |
| G02F 1/1343 | (2006.01) |
| G02F 1/1339 | (2006.01) |
| G09G 3/18 | (2006.01) |
| G09G 3/36 | (2006.01) |

(52) U.S. Cl. .............. 359/245; 359/353; 359/354; 359/464; 345/53; 345/43; 345/102; 349/32; 349/143; 349/155; 349/156

(58) Field of Classification Search .......... 359/245, 359/247, 248, 252–254, 464, 466, 475; 349/25, 349/27, 30, 32, 39, 42, 44, 61, 85, 105, 110–117, 349/124, 139, 141, 143, 144, 147, 201, 33, 349/106, 155, 156; 438/30, 149, 163, 164; 257/72, 75, E27.111, E29.278; 345/76, 87, 345/102, 43, 53, 84, 85
See application file for complete search history.

(56) References Cited

U.S. PATENT DOCUMENTS 4,277,786 A 7/1981 Waldron .............. 345/53

(Continued)

FOREIGN PATENT DOCUMENTS

EP 0 833 183 A1 4/1998

(Continued)

OTHER PUBLICATIONS

European Search Report for corresponding Application No. 07270008.1 dated Jun. 4, 2007.

*Primary Examiner*—Loha Ben
(74) *Attorney, Agent, or Firm*—Renner, Otto, Boisselle & Sklar, LLP

(57) ABSTRACT

A spatial light modulator comprises: a first substrate (25); a second substrate (26); a layer of electrooptic material disposed between the first substrate and the second substrate. A first electrode arrangement (27) is disposed over the first substrate (25); and a second electrode arrangement (35) is disposed over the second substrate (26). The first electrode arrangement (27) comprises first and second electrode layers (28,29) disposed over the first substrate, with the spacing between the first electrode layer (28) and the first substrate (25) being different to the spacing between the second electrode (29) layer and the first substrate (25). The first electrode layer (28) and the second electrode arrangement (35) are configured so as to co-operate, in use, to define a plurality of first addressable regions in the electrooptic material. The second electrode (29) layer and the second electrode arrangement (35) are configured so as to co-operate, in use, to define a plurality of second addressable regions in the electrooptic material.

25 Claims, 19 Drawing Sheets

U.S. PATENT DOCUMENTS

| | | | |
|---|---|---|---|
| 4,448,490 A * | 5/1984 | Shibuya et al. | 349/82 |
| 5,042,918 A * | 8/1991 | Suzuki | 349/42 |
| 5,315,377 A | 5/1994 | Isono et al. | 348/51 |
| 5,321,535 A * | 6/1994 | Ukai et al. | 349/85 |
| 5,576,863 A * | 11/1996 | Aoki et al. | 349/124 |
| 5,608,556 A * | 3/1997 | Koma | 349/143 |
| 5,610,739 A * | 3/1997 | Uno et al. | 349/39 |
| 5,905,557 A * | 5/1999 | Yaniv | 349/143 |
| 5,969,850 A | 10/1999 | Harrold | 359/320 |
| 6,049,424 A | 4/2000 | Hamagishi | 359/464 |
| 6,111,560 A * | 8/2000 | May | 345/102 |
| 6,177,968 B1 * | 1/2001 | Okada et al. | 349/38 |
| 6,275,280 B1 * | 8/2001 | Kajita et al. | 349/155 |
| 6,327,013 B1 * | 12/2001 | Tombling et al. | 349/139 |
| 6,830,701 B2 * | 12/2004 | DeBar et al. | 216/27 |

FOREIGN PATENT DOCUMENTS

EP          0 877 274 A2    11/1998

* cited by examiner

| A | B | C | D | E | F | G | H | 1 | 2 | 3 | 4 | 5 | 6 | 7 |
|---|---|---|---|---|---|---|---|---|---|---|---|---|---|---|
| 1 | 1 | 0 | 0 | 0 | 0 | 0 | 0 | 1 | 1 | 1 | 1 | 0 | 0 | 0 |
| 1 | 1 | 1 | 1 | 1 | 0 | 0 | 1 | 0 | 1 | 1 | 1 | 1 | 0 | 0 |
| 1 | 0 | 0 | 1 | 1 | 1 | 1 | 1 | 0 | 0 | 1 | 1 | 1 | 1 | 0 |
| 1 | 1 | 1 | 1 | 1 | 1 | 0 | 0 | 0 | 0 | 0 | 1 | 1 | 1 | 1 |
| 1 | 1 | 0 | 0 | 0 | 1 | 1 | 1 | 1 | 0 | 0 | 0 | 1 | 1 | 1 |
| 1 | 0 | 0 | 0 | 0 | 0 | 0 | 1 | 1 | 1 | 0 | 0 | 0 | 1 | 1 |
| 1 | 1 | 1 | 0 | 0 | 0 | 1 | 1 | 1 | 1 | 1 | 0 | 0 | 0 | 1 |

Figure 4(c)

Layer 2

Bottom substrate plan view

Top substrate plan view

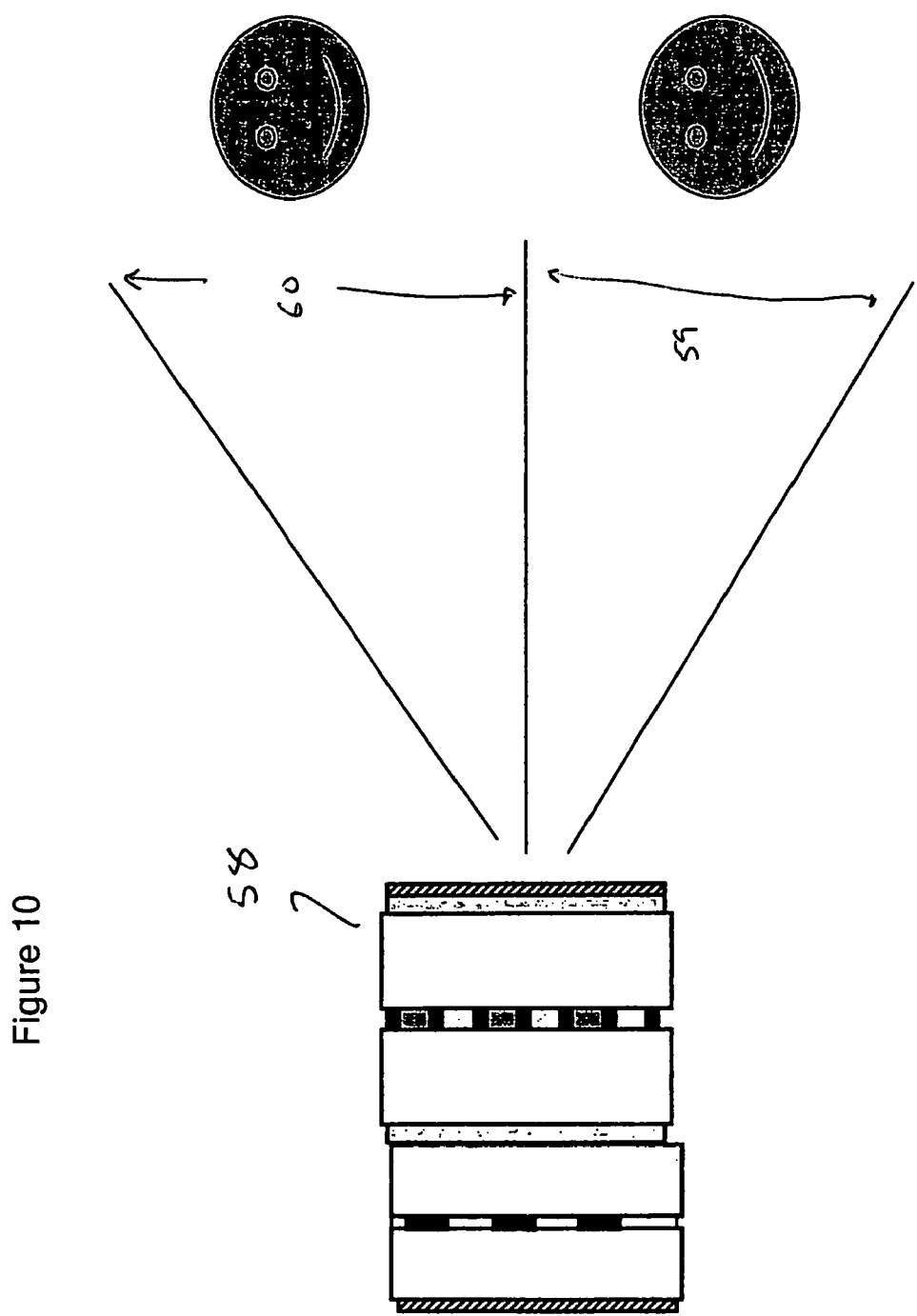

SPATIAL LIGHT MODULATOR AND A DISPLAY DEVICE

FIELD OF THE INVENTION

The present invention relates to a spatial light modulator, and in particular to a spatial light modulator suitable for use as a parallax optic in multiple-view directional display which displays two or more images such that each image is visible from a different direction. It also relates to a display device incorporating a spatial light modulator of the invention

BACKGROUND OF THE INVENTION

For many years conventional display devices have been designed to be viewed by multiple users simultaneously. The display properties of the display device are made such that viewers can see the same good image quality from different angles with respect to the display. This is effective in applications where many users require the same information from the display—such as, for example, displays of departure information at airports and railway stations. However, there are many applications where it would be desirable for individual users to be able to see different information from the same display. For example, in a motor car the driver may wish to view satellite navigation data while a passenger may wish to view a film. These conflicting needs could be satisfied by providing two separate display devices, but this would take up extra space and would increase the cost. Furthermore, if two separate displays were used in this example it would be possible for the driver to see the passenger's display if the driver moved his or her head, which would be distracting for the driver. As a further example, each player in a computer game for two or more players may wish to view the game from his or her own perspective. This is currently done by each player viewing the game on a separate display screen so that each player sees their own unique perspective on individual screens. However, providing a separate display screen for each player takes up a lot of space and is costly, and is not practical for portable games. To solve these problems, multiple-view directional displays have been developed. One application of a multiple-view directional display is as a 'dual-view display', which can simultaneously display two or more different images, with each image being visible only in a specific direction—so an observer viewing the display device from one direction will see one image whereas an observer viewing the display device from another, different direction will see a different image. A display that can show different images to two or more users provides a considerable saving in space and cost compared with use of two or more separate displays.

Examples of possible applications of multiple-view directional display devices have been given above, but there are many other applications. For example, they may be used in aeroplanes where each passenger is provided with their own individual in-flight entertainment programmes. Currently each passenger is provided with an individual display device, typically in the back of the seat in the row in front. Using a multiple view directional display could provide considerable savings in cost, space and weight since it would be possible for one display to serve two or more passengers while still allowing each passenger to select their own choice of film.

A further advantage of a multiple-view directional display is the ability to preclude the users from seeing each other's views. This is desirable in applications requiring security such as banking or sales transactions, for example using an automatic teller machine (ATM), as well as in the above example of computer games.

A further application of a multiple view directional display is in producing a three-dimensional display. In normal vision, the two eyes of a human perceive views of the world from different perspectives, owing to their different location within the head. These two perspectives are then used by the brain to assess the distance to the various objects in a scene. In order to build a display which will effectively display a three dimensional image, it is necessary to re-create this situation and supply a so-called "stereoscopic pair" of images, one image to each eye of the observer.

Three dimensional displays are classified into two types depending on the method used to supply the different views to the eyes. A stereoscopic display typically displays both images of a stereoscopic image pair over a wide viewing area. Each of the views is encoded, for instance by colour, polarisation state, or time of display. The user is required to wear a filter system of glasses that separate the views and let each eye see only the view that is intended for it.

An autostereoscopic display displays a right-eye view and a left-eye view in different directions, so that each view is visible only from respective defined regions of space. The region of space in which an image is visible across the whole of the display active area is termed a "viewing window". If the observer is situated such that their left eye is in the viewing window for the left eye view of a stereoscopic pair and their right eye is in the viewing window for the right-eye image of the pair, then a correct view will be seen by each eye of the observer and a three-dimensional image will be perceived. An autostereoscopic display requires no viewing aids to be worn by the observer.

An autostereoscopic display is similar in principle to a dual-view display. However, the two images displayed on an autostereoscopic display are the left-eye and right-eye images of a stereoscopic image pair, and so are not independent from one another. Furthermore, the two images are displayed so as to be visible to a single observer, with one image being visible to each eye of the observer.

For a flat panel autostereoscopic display, the formation of the viewing windows is typically due to a combination of the picture element (or "pixel") structure of the image display unit of the autostereoscopic display and an optical element, generically termed a parallax optic. An example of a parallax optic is a parallax barrier, which is a screen with transmissive regions, often in the form of slits, separated by opaque regions. This screen can be set in front of or behind a spatial light modulator (SLM) having a two-dimensional array of picture elements to produce an autostereoscopic display.

FIG. 1 is a plan view of a conventional multiple view directional device, in this case an autostereoscopic display. The directional display 1 consists of a spatial light modulator (SLM) 4 that constitutes an image display device, and a parallax barrier 5. The image display SLM 4 of FIG. 1 is in the form of a liquid crystal display (LCD) device having an active matrix thin film transistor (TFT) substrate 6, a counter-substrate 7, and a liquid crystal layer 8 disposed between the substrate and the counter substrate. The SLM is provided with addressing electrodes (not shown) which define a plurality of independently-addressable picture elements, or "pixels", and is also provided with alignment layers (not shown) for aligning the liquid crystal layer. The pixels of the image display SLM 4 are arranged in rows and columns with the columns extending into the plane of the paper in FIG. 1. A linear polariser 10 is provided over the outer surface of the substrate 7 nearest to an observer, and a viewing angle enhancement film 9 may optionally be placed between the polariser 10 and the substrate 7. Illumination is supplied from a backlight 11.

The parallax barrier 5 comprises a substrate 12 with a parallax barrier aperture array 13 formed on its surface adjacent the image display SLM 4. The aperture array comprises vertically extending (that is, extending into the plane of the paper in FIG. 1) transparent apertures 15 separated by opaque portions 14. A linear polariser 16 is formed on the surface of the parallax barrier substrate 12 facing the backlight 11. A further viewing angle enhancement film 9 may optionally be provided between the parallax barrier 5 and the image display SLM 4.

In the display 1 of FIG. 1, the parallax barrier 5 is also in the form of a liquid crystal display (LCD) device, in which a liquid crystal layer 18 is disposed between the substrate 12 and a counter substrate 17. The transparent apertures 15 and opaque portions 14 of the parallax barrier are defined in the liquid crystal layer 18 by suitably addressing the liquid crystal layer, and the parallax barrier LCD is provided with addressing electrodes (shown in FIG. 2(*a*)) which define the transparent apertures 15 and opaque portions 14 of the parallax barrier. The parallax barrier LCD is also provided with alignment layers (not shown) for aligning the liquid crystal layer 18.

FIG. 2(*a*) is a cross-section through the parallax barrier 5, and FIG. 2(*b*) is a plan view of the parallax barrier 5. As described above, the parallax barrier is in the form of a liquid crystal display (LCD) device having a substrate 12, a counter-substrate 17, and a liquid crystal layer 18 disposed between the substrate 12 and the counter substrate 17. The SLM is provided with addressing electrodes $E_i$ (where i=1, 2, 3 . . . ) on the substrate 12. These electrodes $E_i$ are shown in plan view in FIG. 2(*b*) and, as can be seen, they are generally stripe-shaped and extend parallel to but spaced from one another. A counter electrode 21 is provided on the counter substrate 17. Driving circuitry is provided for addressing the electrodes $E_i$, and this is shown schematically as 22 in FIG. 2(*b*). Other components such as alignment films are omitted from FIGS. 2(*a*) and 2(*b*) for clarity.

In a case where the liquid crystal device is "normally white", a parallax barrier may be defined by addressing the electrodes $E_i$ such as to make the corresponding regions of the parallax barrier SLM opaque to form the opaque regions 14 of the parallax barrier. Thus, each electrode defines one opaque region 14 of the parallax barrier. The regions of the parallax barrier SLM corresponding to the gaps between adjacent electrodes remain maximally transmissive to form the transmissive regions 15 of the parallax barrier. Conversely, if the liquid crystal device is "normally black", a parallax barrier is defined by addressing the electrodes $E_i$ such as to make the corresponding regions of the parallax barrier SLM maximally transmissive to form the transmissive regions 15 of the parallax barrier; the regions of the parallax barrier SLM corresponding to the gaps between adjacent electrodes remain opaque and form the opaque regions 14 of the parallax barrier.

In use, two images are displayed on the liquid crystal layer 8 of the image display SLM 4, for example with the two images being interlaced on the columns of pixel. The parallax barrier 5 selectively blocks light so that light passing through a pixel of the liquid crystal layer 8 of the image display SLM 4 is travelling only in a restricted range of directions. The display device 1 thus forms a left-eye image and a right-eye image, and an observer who positions their head such that their left and right eyes are coincident with the viewing window 19 for the left eye image (or the "left viewing window") and the viewing window 20 for the right eye image (or the "right viewing window") respectively will see a three-dimensional image. The left and right viewing windows 19,20 are formed in a window plane at the desired viewing distance from the display.

While the display of FIG. 1 is effective at providing an autostereoscopic 3-D display, an observer will see a 3-D display only if their left and right eyes are aligned with the left and right viewing windows 19,20 respectively. If an observer moves their head such that their left and right eyes are no longer aligned with the left and right viewing windows 19,20, they will cease to see a 3-D image. The lateral width w of the left and right viewing windows 19,20 is typically of the order of 6 cm, so an observer can move their head by no more than this distance if they are to continue to see a 3-D image. The display is said to have low "viewing freedom".

A dual view display is similar in concept to the display 1 of FIG. 1, except that the display displays a first image to an observer with their head positioned in one viewing window and displays a second image to another observer with their head positioned in a second viewing window. Again, an observer must keep their head positioned in the appropriate viewing window in order to see the intended image, and if the observer moves such that their head is no longer in the viewing window they will no longer see the intended image; the movement of the observer is therefore constrained and the display again has a low viewing freedom. While this may not be of consequence in, for example, a motor vehicle where the occupants have only limited freedom to move, it is a significant problem in some possible applications of a dual view display.

There has been considerable effort to increasing the viewing freedom of a multiple view display by eliminating the need for an observer to remain with their head positioned in a constrained region of space in order to see a 3-D image or the intended image of a dual view display. In general, the proposed solutions involve the two steps of (1) monitoring the position of the observer's head and (2) adjusting the positions of the viewing windows of the display in dependence on the determined position of the observer's head. This is known as "observer tracking". As an example, European patent application No. 98302989.3 discloses a method of a method of analysing a scene of video footage and determining a user's position in that scene; the determined position of the user may then be used to adjust the position of the viewing windows of a display.

The position of the viewing windows 19, 20 of the display of FIG. 1 may be altered by moving the opaque regions 14 and transmissive regions 15 of the parallax barrier 5 laterally with respect to the image displayed on the liquid crystal layer 8 of the image display SLM 4. In a display in which the parallax barrier is a fixed parallax barrier—ie, the opaque regions 14 of the parallax barrier are permanently opaque and the transmissive regions 15 of the parallax barrier are permanently transmissive, this may be done by mechanically translating the entire parallax barrier 5 relative to the image display SLM 4. However, this introduces moving parts and so leads to wear and unreliability; the mechanism for translating the barrier also adds weight and bulk to the display. Attention has therefore been directed towards a reconfigurable parallax barrier, in which the opaque regions and the transmissive regions of the parallax barrier are not permanently defined, so that the parallax barrier may be reconfigured by changing the areas of the parallax barrier that are opaque and correspondingly changing the areas of the parallax barrier that are transmissive. The parallax barrier 5 shown in FIG. 1 is a reconfigurable parallax barrier; the transmissive regions 15 and opaque regions 14 are defined in the liquid crystal layer 18 of the parallax barrier 5, and the position of the transmissive regions 15 and opaque regions 14 may be changed by re-addressing the liquid crystal layer 18. Use of a reconfigurable parallax barrier allows the transmissive regions 15 and opaque regions 14 of the parallax barrier to be moved laterally relative to the image display SLM 4 so as to alter the lateral position of the viewing windows 19,20 without the need to translate the entire parallax barrier relative to the SLM 4.

To provide observer tracking, the display 1 is further provided with a position determining portion 61 for determining the position of the observer. The position determining means may be, for example, a camera 62 directed towards the intended position of an observer, and an analyser 63 for determining the position of an observer from an image obtained by the camera 62 (for example according to the method of European patent application No. 98302989.3).

The display 1 further has a controller 64 for controlling the parallax barrier 5. The controller controls the parallax barrier in accordance with the position of the observer as a determined by the analyser 63—the positions of the opaque regions and transmissive regions of the parallax barrier are controlled in dependence on the determined position of the observer such that the position of the left and right viewing windows 19,20 coincide with the instantaneous positions of the observer's eyes.

European patent application No. 97307571.6 describes a method of providing a reconfigurable parallax barrier based on LCD fringing fields. However, this can be difficult to achieve with many common LC modes.

U.S. Pat. No. 6,049,424 discloses a method of providing a reconfigurable parallax barrier; this method is illustrated in FIGS. 3(a) to 3(c).

The parallax barrier of U.S. Pat. No. 6,049,424 is similar to that of FIG. 2(a), in that it uses a liquid crystal SLM. However, the electrodes of the parallax barrier are narrower than the intended opaque regions 14 of the parallax barrier, and an opaque region is defined by addressing a number of adjacent electrodes. Moreover, each of the electrodes $E_i$ is addressable independently of the others. In contrast, in the parallax barrier 5 of FIG. 2(a), each electrode $E_i$ defines one opaque (or transmissive) region of the parallax barrier.

FIG. 3(a) is a plan view of the SLM of U.S. Pat. No. 6,049,424. It shows electrodes $E_1$, $E_2$, $E_3$, $E_6$, $E_7$, $E_8$, $E_{11}$ etc. addressed so as to make the corresponding regions of the SLM opaque, while electrodes $E_4$, $E_5$, $E_9$, $E_{10}$ etc. are addressed so as to make the corresponding regions of the SLM transmissive. The regions of the SLM corresponding to electrodes $E_1$, $E_2$, $E_3$ constitute one opaque region 14 of the parallax barrier, the regions of the SLM corresponding to electrodes $E_5$, $E_6$ constitute one transmissive slit 15 of the parallax barrier, the regions of the SLM corresponding to electrodes $E_6$, $E_7$, $E_8$ constitute a second opaque region 14 of the parallax barrier, and so on.

The parallax barrier may be reconfigured by re-addressing the electrodes, and this is shown in FIGS. 3(b) and 3(c). In FIG. 3(b), electrodes $E_2$, $E_3$, $E_4$, $E_7$, $E_8$, $E_9$, $E_{12}$ ect. are addressed so as to make the corresponding regions of the SLM opaque while electrodes $E_1$, $E_5$, $E_6$, $E_{10}$, $E_{11}$ etc. are addressed so as to make the corresponding regions of the SLM transmissive, and in FIG. 3(c), electrodes $E_3$, $E_4$, $E_5$, $E_8$, $E_9$, $E_{10}$ etc. are addressed so as to make the corresponding regions of the SLM opaque while electrodes $E_1$, $E_2$, $E_6$, $E_7$, $E_{11}$, $E_{12}$ etc. are addressed so as to make the corresponding regions of the SLM transmissive. The effect of reconfiguring the parallax barrier is that the opaque regions and transmissive regions of the parallax barrier "move" laterally across the SLM. If such an SLM is used to provide the parallax barrier in a multiple view display, it is possible to change the positions of the viewing windows 19,20 so as to track a moving observer.

The method of U.S. Pat. No. 6,049,424 has the disadvantage that there is necessarily a gap 23 between adjacent electrodes; these gaps are typically 10 μm wide, and each gap 23 will lead to a corresponding region of the liquid crystal layer that is not addressed. The unaddressed regions will appear as narrow transmissive stripes within an opaque region 14 of the barrier and will degrade the 3-D (or dual view) performance of the display by allowing cross-talk ("cross talk" occurs where an image intended for viewing from the first [or second] viewing window 19 [20] is also visible from the second [or first] viewing window 20 [19]). Moreover, each electrode $E_i$ must be individually addressed, and this requires expensive drive circuitry.

SUMMARY OF THE INVENTION

A first aspect of the present application provides a spatial light modulator comprising: a first substrate; a second substrate; a layer of electrooptic material disposed between the first substrate and the second substrate; a first electrode arrangement disposed over the first substrate; and a second electrode arrangement disposed over the second substrate; wherein the first electrode arrangement comprises first and second electrode layers disposed over the first substrate, the spacing between the first electrode layer and the first substrate being different to the spacing between the second electrode layer and the first substrate; wherein the first electrode layer and the second electrode arrangement are configured so as to co-operate, in use, to define a plurality of first addressable regions in the electrooptic material; wherein the second electrode layer and the second electrode arrangement are configured so as to co-operate, in use, to define a plurality of second addressable regions in the electrooptic material.

The first electrode layer may comprise a set of first electrodes and a set of second electrodes, the set of first electrodes being addressable independently of the set of second electrodes. In this embodiment the first electrode layer requires only two electrical connections, one connection for the set of first electrodes and one connection for the set of second electrodes.

The first electrodes may be interdigitated with the second electrodes.

The second electrode layer may comprise a set of third electrodes and a set of fourth electrodes, the set of third electrodes being addressable independently of the set of fourth electrodes. In this embodiment the first electrode layer requires only two electrical connections, one connection for the set of third electrodes and one connection for the set of fourth electrodes. This allows the first electrode arrangement to have only four electrical connections in total, and only four drive circuits are required for the first electrode arrangement. In contrast, in the SLM of U.S. Pat. No. 6,049,424 each addressable region is defined by its own respective electrode $E_i$, so that expensive drive circuitry is required to enable each electrode to be individually addressed.

The third electrodes may be interdigitated with the fourth electrodes.

The first electrode layer may comprise a set of first electrodes and a set of second electrodes, and a third electrode may be at least contiguous with a gap between a first electrode and a second electrode.

The first electrode layer may comprise a set of first electrodes and a set of second electrodes, and a fourth electrode of the fourth set may be at least contiguous with a gap between a first electrode and a second electrode.

The second electrode layer may comprise a set of third electrodes and a set of fourth electrodes, and a first electrode may be at least contiguous with a gap between a third electrode and a fourth electrode.

The second electrode layer may comprise a set of third electrodes and a set of fourth electrodes, and wherein a second electrode may be at least contiguous with a gap between a third electrode and a fourth electrode.

An electrode of the first set may have a width substantially equal to the width of an electrode of the second set.

An electrode of the third set may have a width substantially equal to half the width of an electrode of the fourth set.

Each second addressable region may be contiguous with or overlap a respective first addressable region.

A further advantage of providing the first and second electrode layers at different spacings from the first substrate is that it allows the gap between adjacent addressable regions in U.S. Pat. No. 6,049,424, arising from the gap 23 between neighbouring electrodes, to be eliminated. By eliminating the unaddressed regions of the liquid crystal layer in the SLM of U.S. Pat. No. 6,049,424, the transmissive gaps in the opaque regions 14 of a parallax barrier defined in the SLM are consequently eliminated. When an SLM of this embodiment is used to provide the parallax barrier in a multiple view display, it can provide a reconfigurable parallax barrier that allows the positions of the viewing windows to be changed in accordance with the position of an observer to provide observer tracking; however, the elimination of the transmissive gaps in the opaque regions 14 of the parallax barrier avoids cross-talk between the two images and improves the display quality.

Each second addressable region may overlap a respective first addressable region The first and second electrode arrangements may be configured so as to further define a plurality of third addressable regions in the electrooptic material, each third addressable region being at least contiguous with a respective second addressable region.

The first and second electrode arrangements may be configured so as to further define a plurality of fourth addressable regions in the electrooptic material, each fourth addressable region being at least contiguous with a respective third addressable region.

The second electrode arrangement may comprise third and fourth electrode layers disposed over the second substrate, the spacing between the third electrode layer and the second substrate being different to the spacing between the fourth electrode layer and the second substrate.

Alternatively, the second electrode arrangement could consist simply of a single counter electrode disposed over the second substrate.

The third electrode layer may comprise a set of fifth electrodes and a set of sixth electrodes, the set of fifth electrodes being addressable independently of the set of sixth electrodes.

The fifth electrodes may be interdigitated with the sixth electrodes.

The fourth electrode layer may comprise a set of seventh electrodes and a set of eighth electrodes, the set of seventh electrodes being addressable independently of the set of eighth electrodes. The second electrode arrangement thus requires four drive circuits and four electrical connections.

The seventh electrodes may be interdigitated with the eighth electrodes.

Alternatively, groups of seventh electrodes may be interdigitated with groups of eighth electrodes. A group of seventh electrodes may contain the same number of electrodes as a group of eighth electrodes, or a group of seventh electrodes may contain a different number of electrodes to a group of eighth electrodes. A group of seventh electrodes may contain only one electrode, or a group of eighth electrodes may contain only one electrode. This may also apply to the first and second electrodes mentioned above, to the third and fourth electrodes mentioned above, and to the first and sixth electrodes mentioned above.

The width of a first or second addressable region may be dependent upon the lateral position of the addressable region.

The width of a third or fourth addressable region may be dependent upon the lateral position of the third or fourth addressable region.

The electrooptic layer may be a layer of liquid crystal material.

A second aspect of the invention provides a multiple view directional display comprising an image display layer; a spatial light modulator disposed in the path of light through the image display layer; and means for addressing the spatial light modulator to define a parallax barrier; wherein the spatial light modulator is a modulator of the first aspect.

The display may be a dual view display, or an autostereoscopic 3-D display.

An autostereoscopic 3-D display of the invention may further comprise: position determining means for determining the position of an observer; and a controller for controlling the spatial light modulator in accordance with a determined position of the observer. Such a display can provide observer tracking. The parallax barrier of the display is defined in the spatial light modulator, and observer tracking is provided by controlling the spatial light modulator such that the positions of the opaque regions and transmissive regions of the parallax barrier vary in dependence on the determined position of the observer.

BRIEF DESCRIPTION OF THE DRAWINGS

Preferred embodiments of the present invention will now be described by way of illustrative example with reference to the accompanying figures in which:

FIG. 4(*c*) illustrates the addressing of the spatial light modulator of FIG. 4(*a*);

FIG. 4(*d*) is a block flow diagram illustrating operation of the spatial light modulator of FIG. 4(*a*);

FIGS. 5(*c*) and 5(*d*) illustrate a possible liquid crystal alignment of the spatial light modulator of FIG. 4(*a*);

FIG. 10 is a schematic plan view of a dual view display incorporating a spatial light modulator of the present invention.

DETAILED DESCRIPTION OF THE PREFERRED EMBODIMENTS

In a spatial light modulator (SLM) of the present invention, a layer of electrooptic material is addressed by means of a first electrode arrangement and second electrode arrangement. The first and second electrode arrangements are configured so as to define a plurality of addressable regions in the electrooptic material. This enables a reconfigurable parallax barrier to be defined in the SLM, by driving some of the addressable regions to be opaque while driving other of the addressable regions to be transmissive. The parallax barrier may be reconfigured by re-selecting those addressable regions which are driven to be opaque and those regions which are driven to be transmissive, as in U.S. Pat. No. 6,049,424. The layer of electrooptic material may be, for example, a layer of liquid crystal material.

In the present invention, the addressable regions are preferably defined in the electrooptic material such that an addressable region is at least contiguous with a neighbouring addressable region. By "at least contiguous", it is meant that an addressable region overlaps, or is contiguous with, a neighbouring addressable region. Thus, the transmissive gaps in the opaque regions 14 of the parallax barrier defined in U.S. 6,049,424 are eliminated.

Figure 4B:
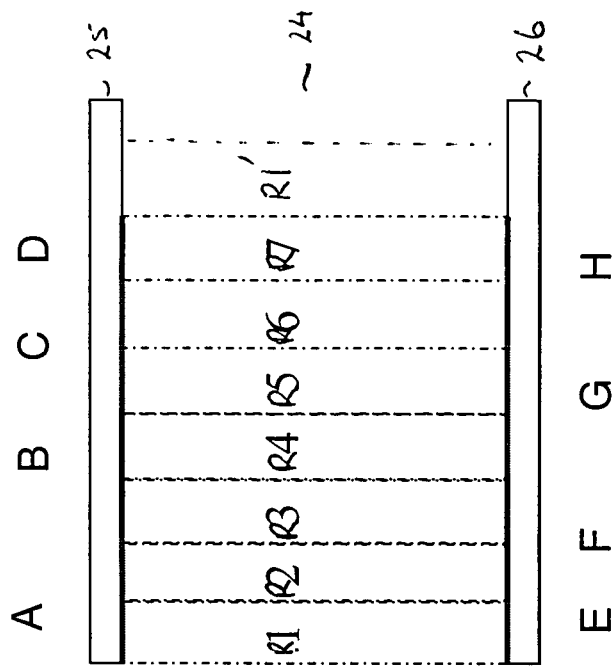
FIGS. 4(*a*) and 4(*b*) are cross-sectional views and plan views, respectively, of a spatial light modulator according to the present invention.

The principle of this embodiment of the invention is illustrated in FIG. 4(b), which is a schematic plan view through a SLM of the present invention. FIG. 4(b) illustrates 7 addressable regions defined in the layer 24 of electro optic material disposed between first and second substrates 25, 26. The addressable regions are labelled as R1 . . . R7. It can be seen that an addressable region, for example, region R2, is contiguous with its neighbouring addressable regions R1, R3.

The addressable regions R1-R7 shown in FIG. 4(b) are formed in the region of the parallax barrier that corresponds to a pixel set of the image display SLM 4. A pixel "set" comprises at least two laterally-adjacent pixels and the number of pixels in a set corresponds to the number of views shown by the display. For example, for a standard two view autostereoscopic 3-D display, a pixel set will contain two adjacent pixels. In this context a "pixel" may refer to a single colour sub-pixel or to a full white pixel or to any other grouping of pixels or sub-pixels. Addressable regions are defined in the same way for each pixel set of the image display SLM 4, so that 7 addressable regions are defined in each region of the parallax barrier corresponding to a pixel set of the image display SLM. One addressable region R1' for the area of the parallax barrier that corresponds to a neighbouring pixel is shown in FIG. 4(b). Thus, a plurality of first addressable regions R1, R1' are defined in the electrooptic layer, a plurality of second addressable regions R2 are defined in the electrooptic layer, and so on.

Preferably, each addressable region defined in the electrooptic layer is contiguous with, or overlaps, the two neighbouring addressable regions (apart from the addressable regions at the extreme edges of the electrooptic layer which are contiguous with, or overlap, their sole neighbouring region R2, R6.

In the present invention the addressable regions defined in the electro optic material are arranged in sets of addressable regions, as a set of first addressable regions R1,R1', a set of second addressable regions R2, a set of $i^{th}$ addressable regions, up to a set of $N^{th}$ addressable regions. The addressable regions of the first set are switched together, the addressable regions of the second set are switched together (but can be switched independently of the first addressable regions) and so on.

Figure 1:
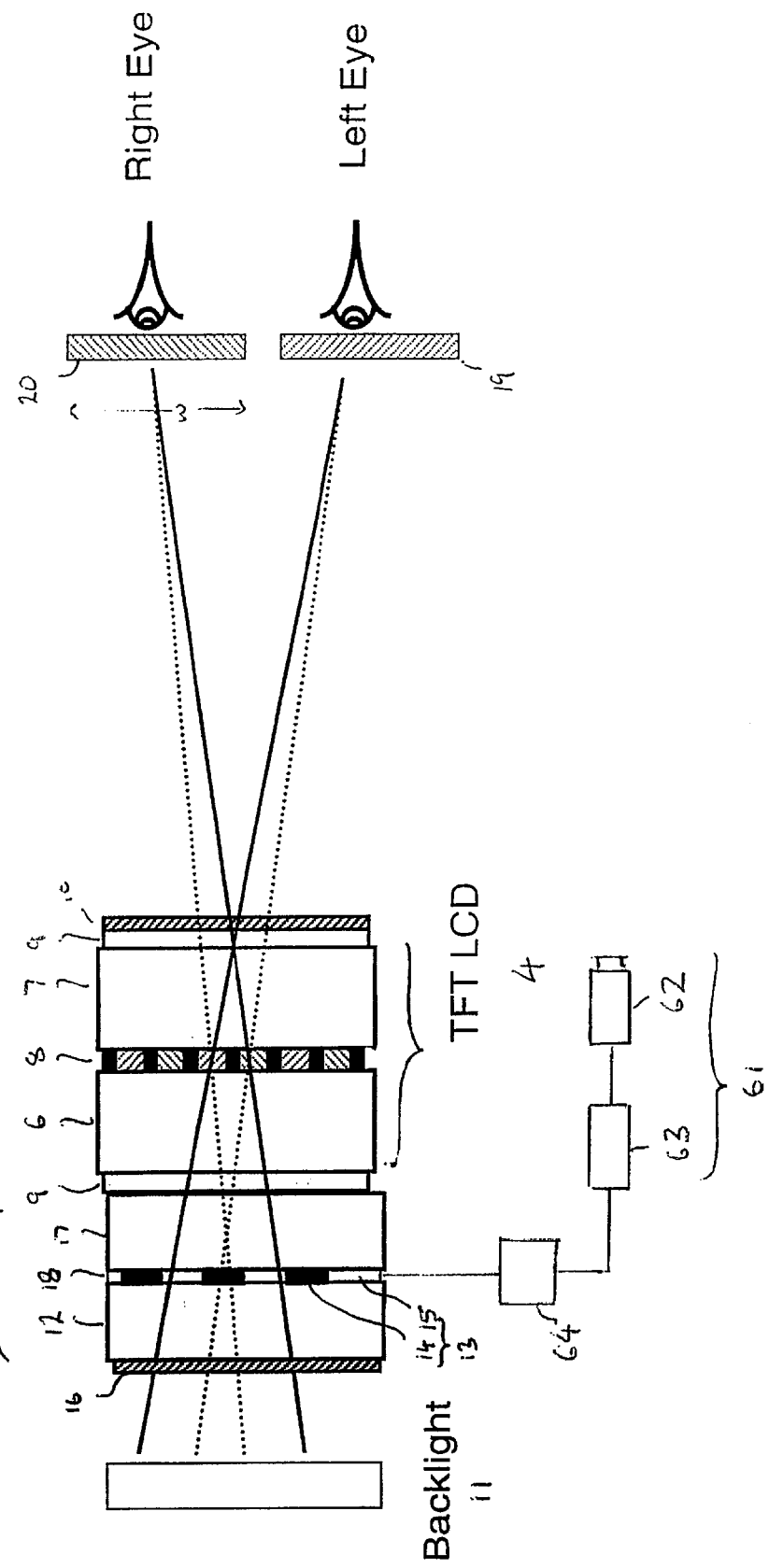
FIG. 1 is a schematic plan view of a conventional autostereoscopic 3-D display.
Figure 2B:
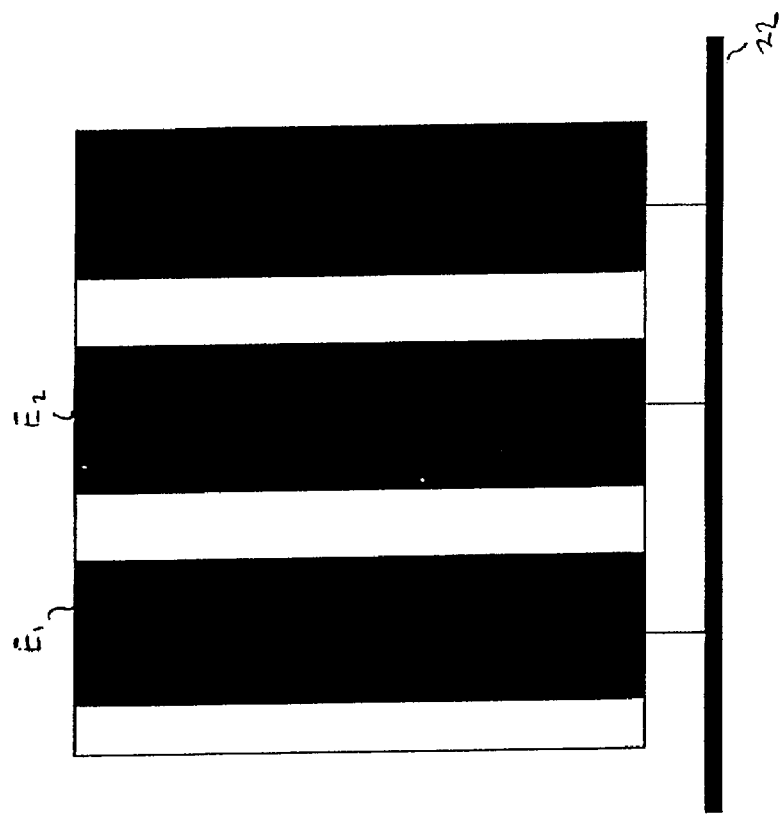
FIGS. 2(*a*) and 2(*b*) are cross-sectional and plan views, respectively, of the parallax barrier of the display of FIG. 1.
Figure 2A:
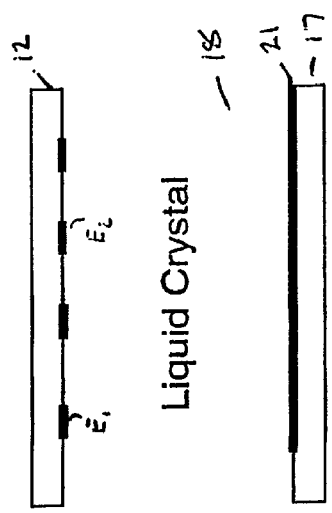
Figure 3A:
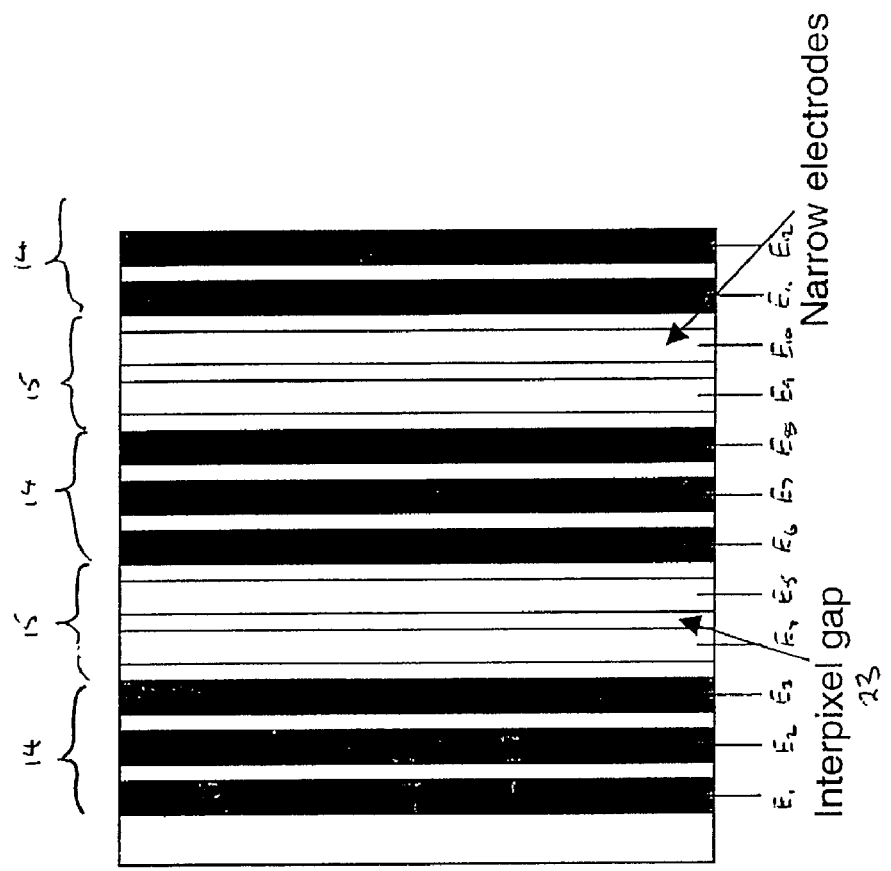
FIGS. 3(*a*) to 3(*c*) illustrate the reconfigurable parallax barrier of U.S. Pat. No. 6,049,424.
Figure 3B:
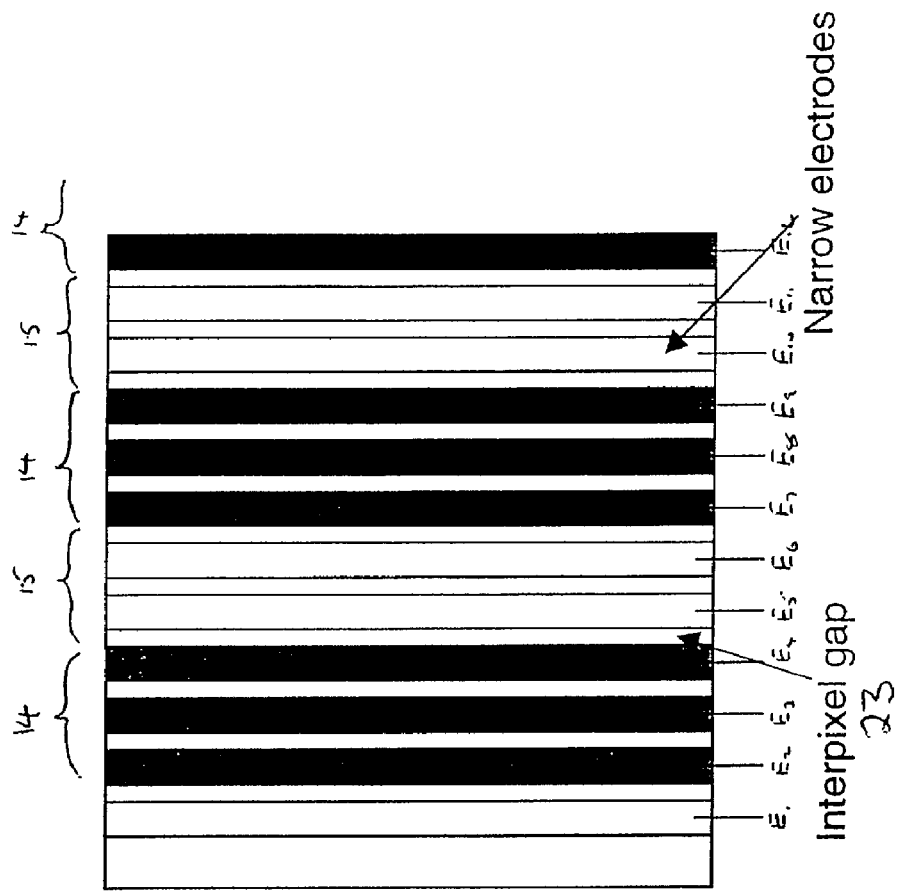
Figure 3C:
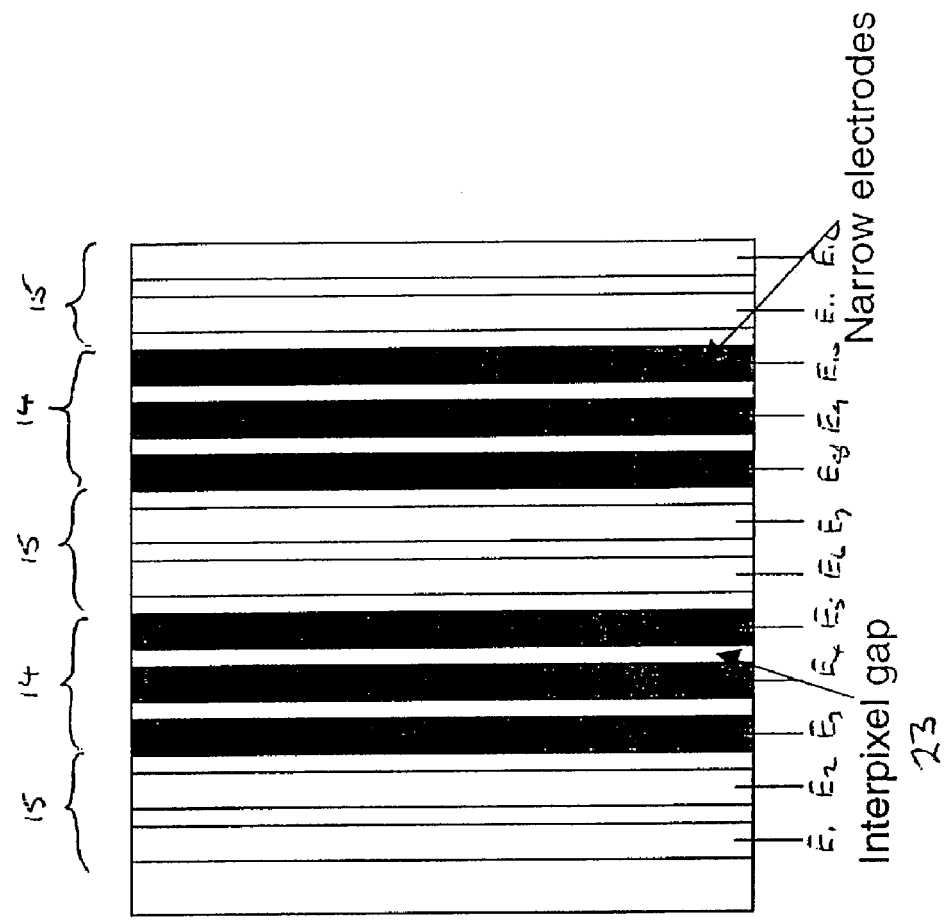
Figure 4A:
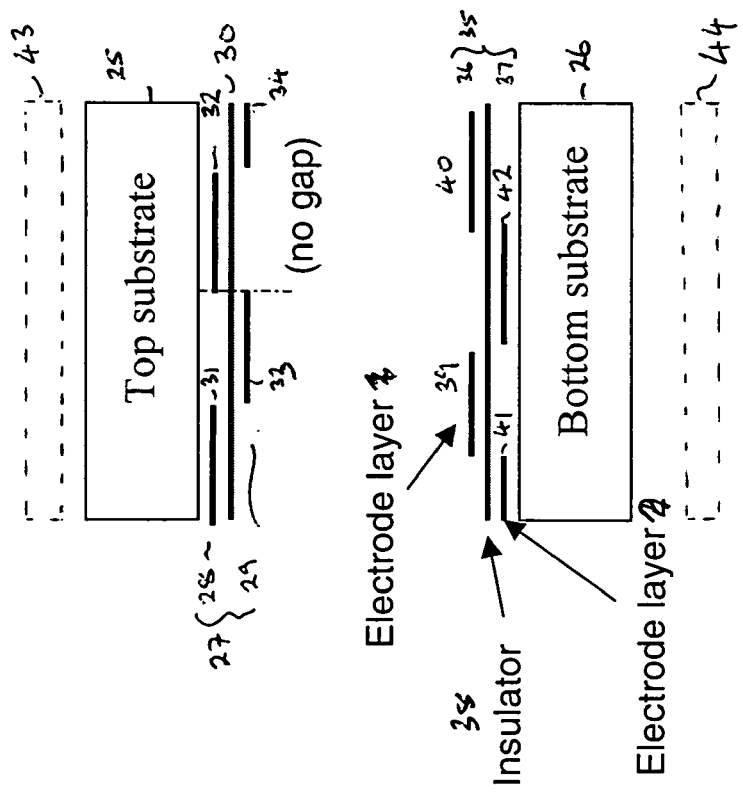

In the embodiment of FIGS. 4(a) and 4(b), sets of first addressable regions up to seventh addressable regions are defined in the electro optic materials—that is N=7. However, the invention is not limited to this particular number of sets of addressable regions. In principle, N can be equal to 2, or to any integer greater than 2. In practice, however, in the case where only first and second sets of addressable regions are defined in the electro optic material (ie, N=2), it is possible to reconfigure a parallax barrier defined in the electro optic material only by changing opaque regions into transmissive regions and vice versa. This will interchange the position of, in the case of an autostereoscopic 3-D display, the left viewing region 19 and the right viewing region 20. This effect can, however, also be achieved by re-addressing the image display layer 8 of the display of FIG. 1, without altering the parallax barrier 5. It is therefore preferable that at least a set of first addressable regions, a set of second addressable regions and a set of third addressable regions are defined in the layer of electro optic material to allow more effective observer tracking.

FIG. 4(a) is a sectional view through the SLM of the first embodiment of the invention illustrating possible configurations for electrode arrangements on the first and second substrates 25, 26 that can provide first to seventh regions in the electrooptic layer. FIG. 4(a) shows the portion of the SLM that corresponds to a pixel of the image display SLM 4 of the display 1 and provides the first to seventh addressable regions R1 to R7 of FIG. 4(b).

In this embodiment a first electrode arrangement 27 is provided on the first substrate 25, and the first electrode arrangement 27 comprises a first electrode layer 28 and a second electrode layer 29. The first and second electrode layers are disposed over the first substrate 25 such that the spacing between the first electrode layer 28 and the first substrate 25 is different from the spacing between the second electrode layer 29 and the first substrate 25. An electrically insulating layer 30 is disposed between the first electrode layer 28 and the second electrode layer 29 to ensure that the first electrode layer 28 is electrically isolated from the second electrode layer 29.

The first and second electrode layers 28, 29 are each patterned to define a plurality of electrodes 31,32;33,34. Where the SLM is intended for use as a parallax barrier, the electrodes defined in the first and second electrode layers 28, 29 will be stripe electrodes that extend into the plane of the paper in FIG. 4(*a*). The precise shape and size of the electrodes may, however, be chosen in accordance with the intended use of a particular SLM.

Figure 4D:
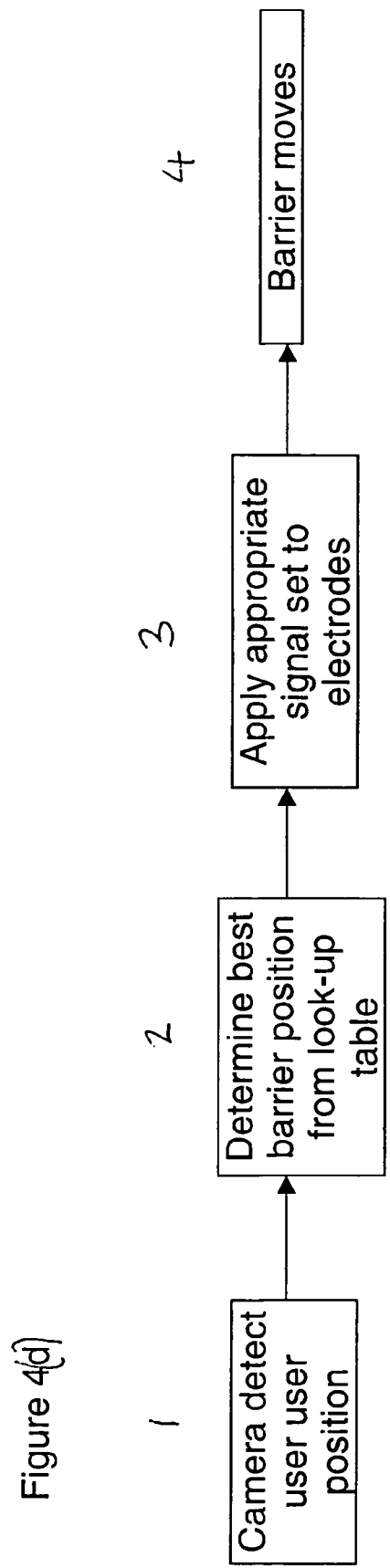

In the SLM of FIG. 4(*a*), the electrodes 33,34 defined in the second electrode layer 29 correspond in shape and size to a gap between adjacent electrodes 31, 32 in the first electrode layer 28. As a result, there is no lateral gap between an electrode 31,32 in the first electrode layer and a neighbouring electrode 33,34 in the second electrode layer; the gaps 23 between adjacent electrodes in the SLM of U.S. Pat. No. 6,049,424 have been eliminated. As a consequence, an addressable region defined in the electrode optic layer by one electrode, for example the electrode 32 shown in FIG. 4(*a*), is contiguous with a neighbouring addressable region, for example, the addressable region defined by the electrode 33 in FIG. 4(*a*).

If desired, electrodes 33,34 defined in the second electrode layer 29 may be wider than the gaps between neighbouring electrodes 33,34 in the first electrode layer so that electrodes 33,34 defined in the second electrode layer 29 overlap neighbouring electrodes defined in the first electrode layer; similarly, electrodes 31,32 defined in the first electrode layer 28 may overlap neighbouring electrodes defined in the second electrode layer. This would mean that an addressable region defined by one electrode in the electrooptic layer would overlap with an addressable region defined by a neighbouring electrode, and this may be of advantage in some applications as is described further below. Furthermore, the electrodes may be defined to provide a slight overlap with one another to compensate for tolerances in the process of fabricating the electrodes, to ensure that unaddressed regions of the electro optic layer are not inadvertently created as a result of variations in the manufacturing process.

In a preferred embodiment of the invention, the first electrode layer 28 is patterned to provide two sets of electrodes, with the first set of electrodes being addressable independently of the second set of electrodes. One way in which this may be done is shown in FIG. 5(*b*), which is a plan view of the first electrode layer 28. It can be seen that two sets of electrodes are defined in the first electrode layer 28, with electrodes 31 of the first set being interdigitated between electrodes 32 of the second set. Each electrode 31 of the first set (or "first electrode") is connected to a first busbar 31A, and each electrode 32 of the second set (or "second electrode") is connected to a second busbar 32A. Each busbar 31A, 32A is connected to a respective interface (not shown) which enables suitable drive circuitry to be connected.

The second electrode layer 29 is also preferably patterned to define two independent addressable sets of electrodes. FIG. 5(*a*) shows, as one example, the first electrode layer 29 patterned to provide a third set of electrodes 33 and a fourth set of electrodes 34, with each electrode of the third set 33 (or "third electrode") being interdigitated between electrodes 34 of the fourth set (or "fourth electrode"). Each third electrode 33 is connected to a third busbar 33A and each fourth electrode 34 is connected to a fourth busbar 34A. The busbars 33A, 34A are connected to respective interfaces (not shown) to enable suitable drive circuitry to be connected.

It should be noted that FIGS. 5(*a*) and 5(*b*) illustrate a larger portion of the SLM of the first embodiment than is shown in FIGS. 4(*a*) and 4(*b*). The arrow P in FIG. 5(*a*) or 5(*b*) denotes the pitch of the SLM, and FIG. 4(*a*) shows a portion of the SLM corresponding in width to the length of the arrow P.

The first electrode arrangement 27 of FIG. 4(*a*) can therefore be seen to comprise first to fourth sets of independently addressable electrodes 32-34. The first electrode arrangement requires only four electrical contacts to be made, and requires only four drive circuits. In contrast, in the SLM of U.S. Pat. No. 6,049,424 each addressable region is defined by its own respective electrode $E_i$, so that expensive drive circuitry is required to enable each electrode to be individually addressed.

In principle, the first electrode arrangement 27 shown in FIG. 4(*a*) could be used with a second electrode arrangement consisting simply of a single counter electrode disposed over the entire second substrate 26. This would allow sets of first to fourth addressable regions to be defined in the electrooptic material, and this could be used to implement a simple reconfigurable parallax barrier. For example, the first and third sets of electrodes 31, 32 could initially be driven to make the corresponding regions of the SLM opaque, with the second and fourth sets of electrodes 33, 34 driven to make the corresponding regions of the SLM transparent. The parallax barrier could then be reconfigured, for example, to compensate for movement of the observer, by driving the second and third sets of electrodes 33, 32 to make the corresponding regions of the SLM opaque, and driving the first and second fourth sets of electrodes 31, 34 to make corresponding regions of the SLM transparent.

In many applications, however, it is desirable to provide more than first to fourth sets of addressable regions in the electrooptic material, (to allow greater flexibility in defining a particular parallax barrier (for example varying the ratio between the width of the opaque regions 14 of the barrier to the width of the transmissive region 15 of the barrier), or by providing finer control over the "lateral movement" of the opaque and transmissive regions of the barrier. In a particularly preferred embodiment of the invention, therefore, the second electrode arrangement 35 provided on the second substrate 26 is not a single counter-electrode, but again includes two or more sets of independently addressable electrodes. In the embodiment of FIG. 4(*a*), the second electrode arrangement 35 is similar to the first electrode arrangement 27, and comprises a third electrode layer 36 and a fourth electrode layer 37 disposed over the second substrate 26, with the spacing between the third electrode layer 36 and the second substrate 26 being different to the spacing between the fourth electrode layer 37. The third electrode layer 36 is patterned to define a set of fifth electrode 39 and a set of sixth electrodes 40, with the set of fifth electrodes 39 being addressable independently of the set of sixth electrodes 40. Further, the fourth electrode layer 37 is patterned to provide a set of seventh electrodes 41 and a set of eight electrodes 42, with the set of seventh electrodes 41 being addressable independently of the set of eighth electrodes 42. The fifth electrodes 39 and the sixth electrodes 40 are preferably interdigitated with one another, and the seventh electrodes 41 and the eight electrodes 42 are preferably interdigitated with one another, in the manner shown in FIG. 5(*a*) or 5(*b*). Each set of fifth to eighth electrodes is preferably connected to a respective busbar which, in turn, is connected to a respective interface to allow suitable driving circuitry to be connected.

It can therefore be seen that the SLM of FIG. 4(*a*) requires a total of eight electrical connections:—four connections to the first electrode arrangement 27 on the first substrate 25, one of each of the first to fourth sets of electrodes, and four connections to the second electrode arrangement 35 on the second substrate 26, one for each of the fifth to eighth sets of electrodes. These 8 connections are required independent of the physical size of the SLM. In contrast, the SLM of U.S. Pat. No. 6,049,424 requires one connection for each pixel electrode $E_i$.

In the SLM of FIG. 4(a), the first to seventh addressable regions in the electrooptic layer are defined as follows:

| Addressable Region | First Substrate | Second Substrate |
|---|---|---|
| First addressable region R1 | First electrode 31 | Seventh electrode 41 |
| Second addressable region R2 | First electrode 31 | Fifth electrode 39 |
| Third addressable region R3 | Third electrode 33 | Fifth electrode 39 |
| Fourth addressable region R4 | Third electrode 33 | Eighth electrode 42 |
| Fifth addressable region R5 | Second electrode 32 | Eighth electrode 42 |
| Sixth addressable region R6 | Second electrode 32 | Sixth electrode 40 |
| Seventh addressable region R7 | Fourth electrode 34 | Sixth electrode 40 |

This is shown schematically in FIG. 4(b) in which the first electrode 31 is denoted by A, the second electrode 32 by C, the third electrodes by B and the fourth electrodes by D. On the lower substrate, the fifth electrode 39 is denoted by F, the sixth electrode 40 by H, the seventh electrode 41 by E, and the eighth electrode 42 by G.

As explained above, only four electrical connections are needed for each substrate, so that simple drive circuitry can be used. The details of the drive circuitry, and the required driving voltages, will depend on the nature of the electrooptic material in the SLM.

Figure 5A:
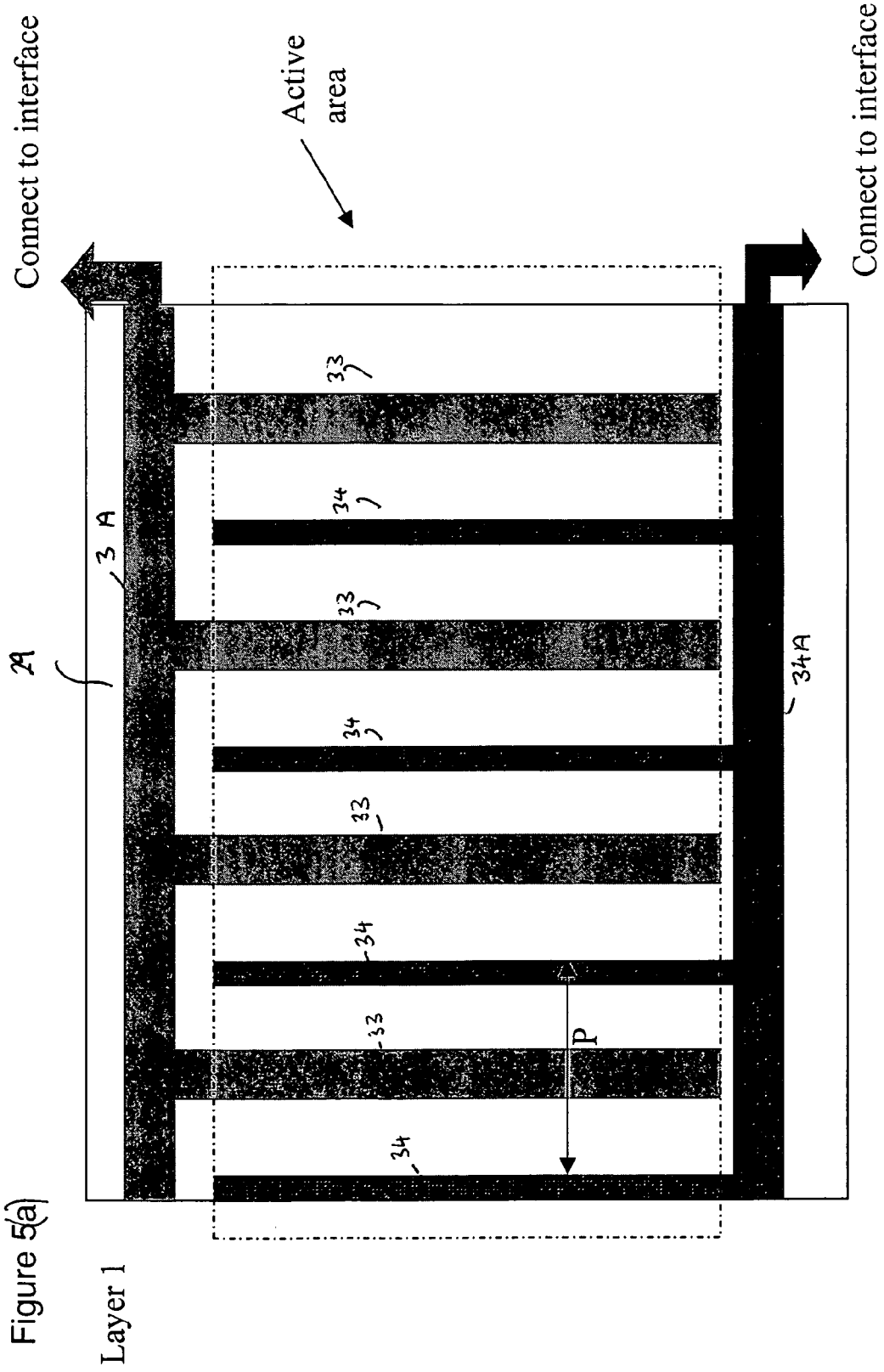
FIGS. 5(*a*) and 5(*b*) are plan diagrams of electrode layers of the spatial light modulator of FIG. 4(*a*)
Figure 5B:
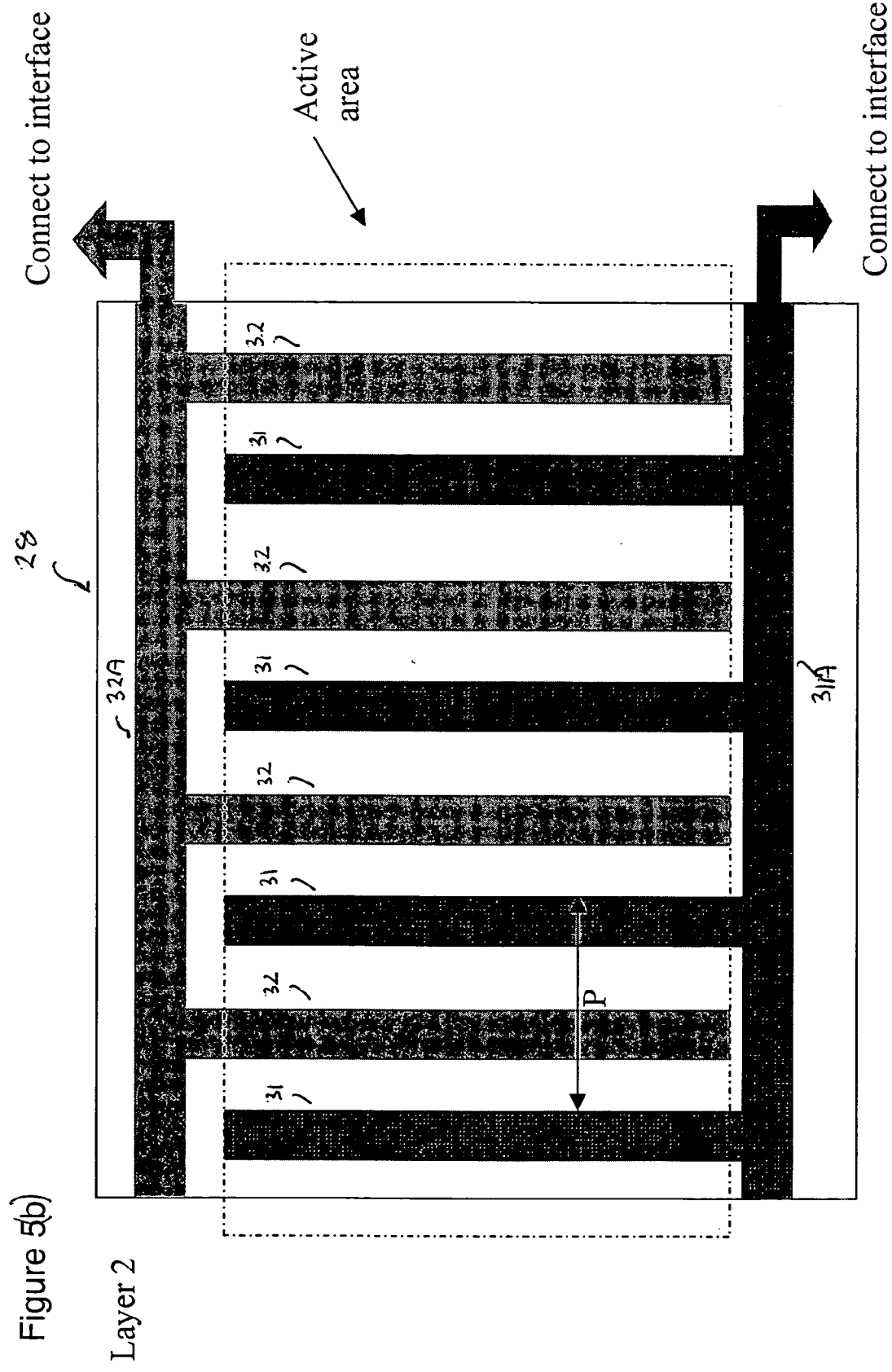
Figure 5D:
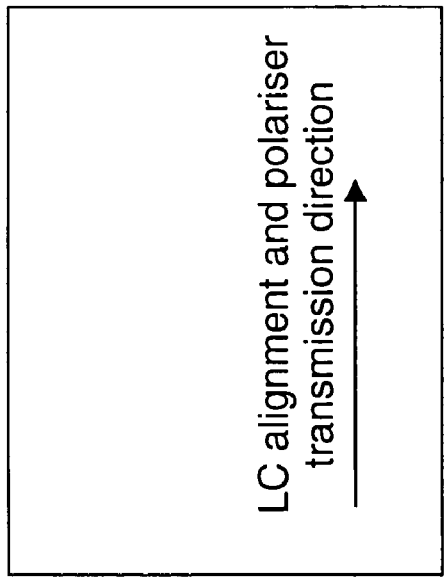
Figure 5C:
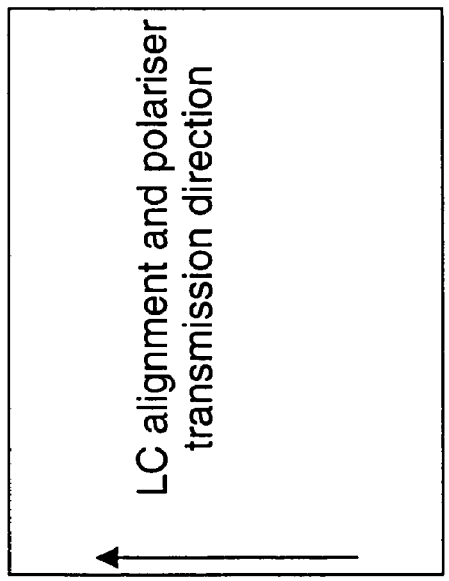
Figure 6A:
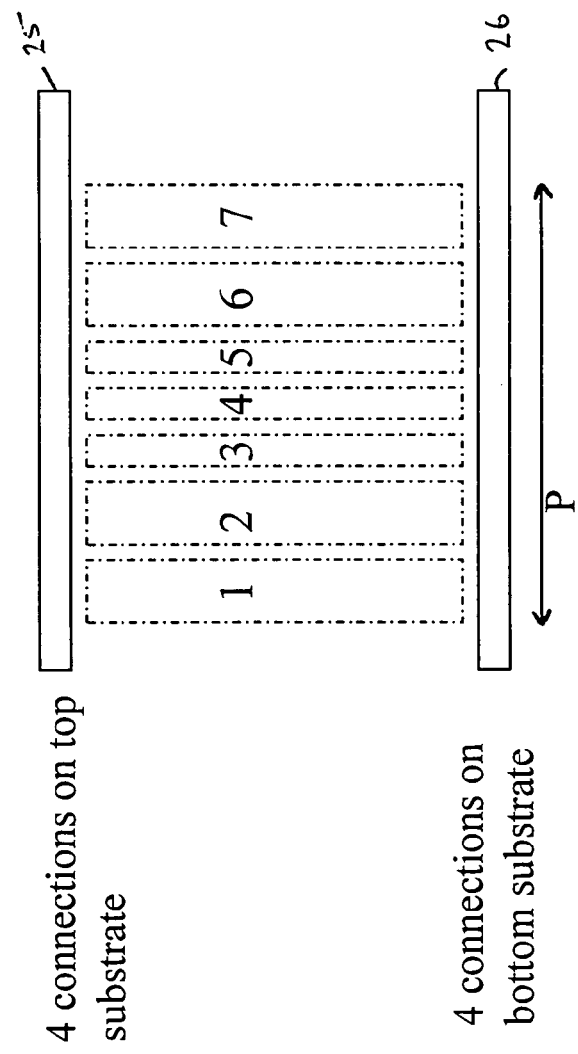
FIG. 6(a) is a schematic plan view of a spatial light modulator according to a second embodiment of the present invention.
Figure 6B:
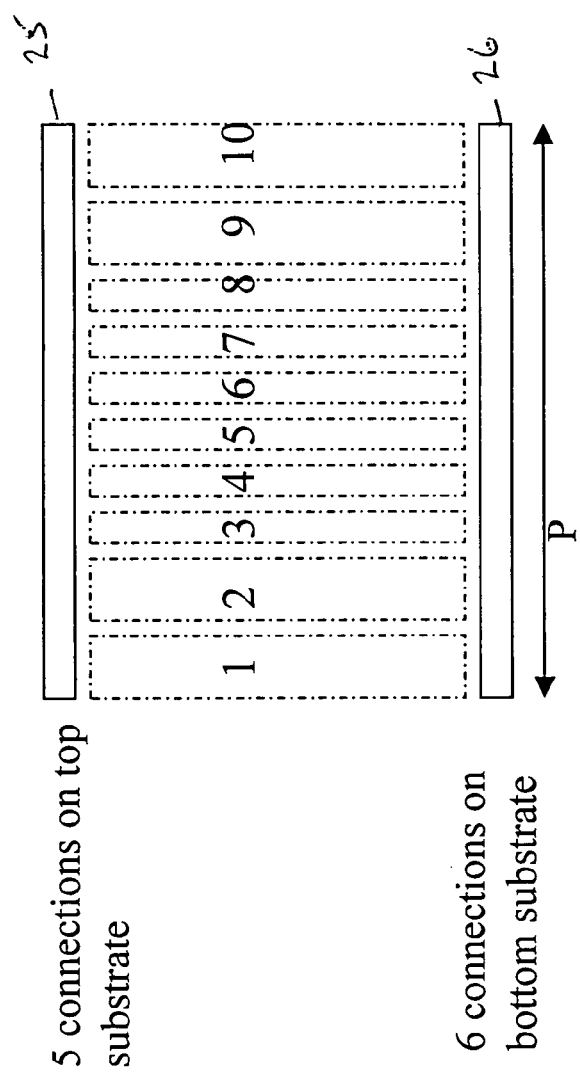
FIGS. 6(b) and 6(c) are a schematic plan view and a schematic cross-sectional view respectively of a spatial light modulator according to a third embodiment of the present invention.
Figure 6C:
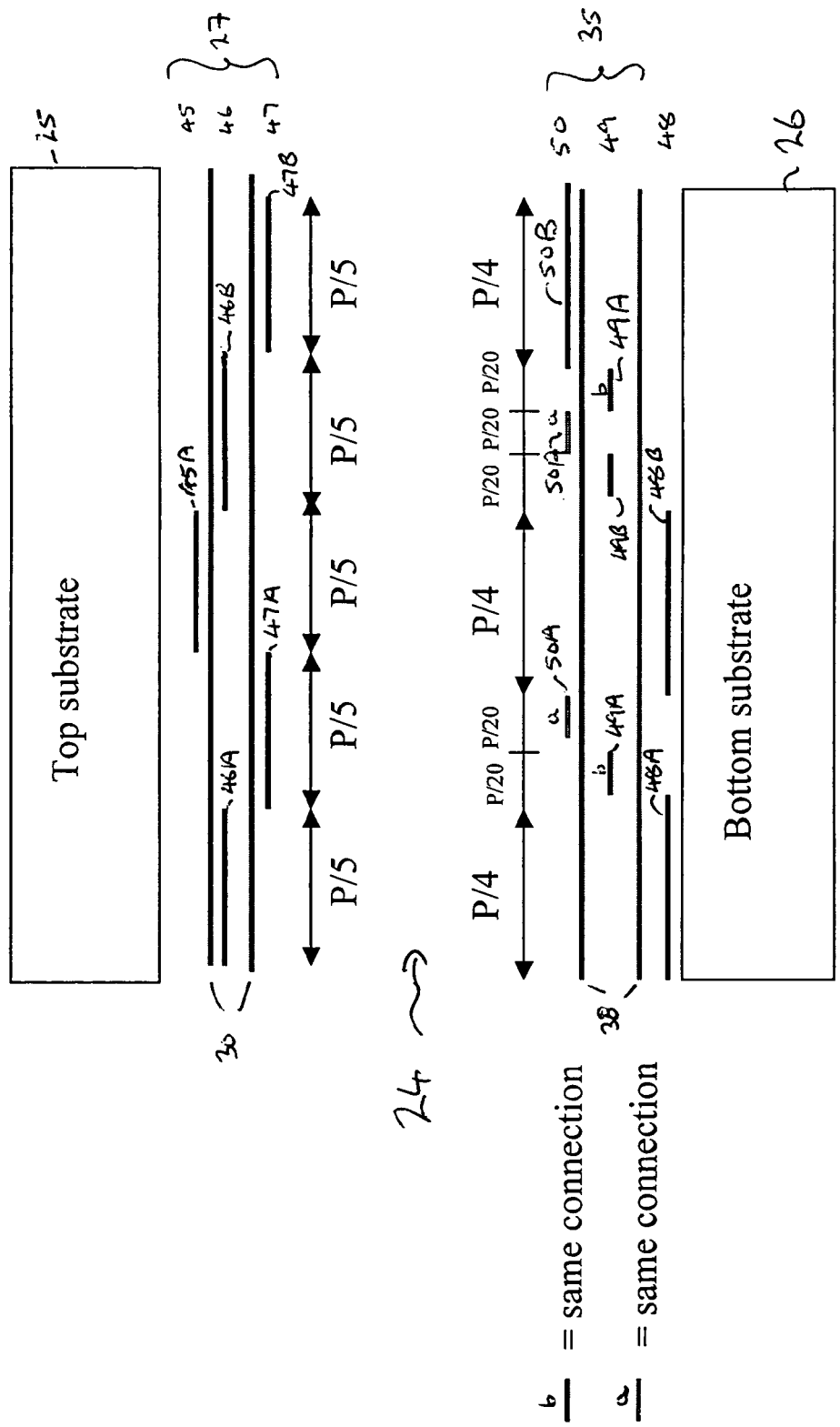
Figure 6D:
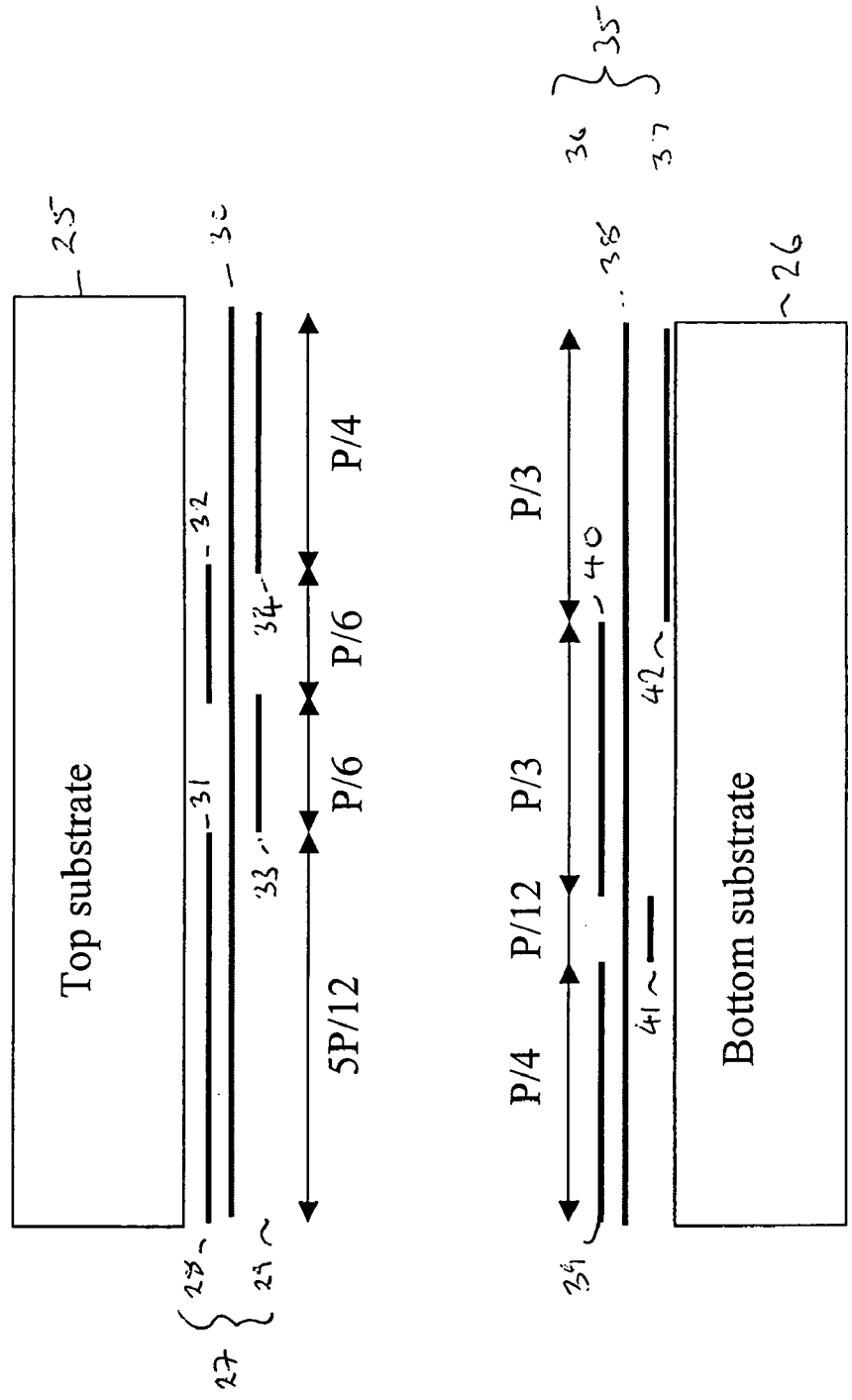
FIG. 6(d) is a schematic cross-sectional view of a spatial light modulator according to a third embodiment of the present invention.

In a preferred embodiment, the electrooptic material is a liquid crystal material. In principle, any suitable liquid crystal mode may be used in an SLM of the invention. As one example, the simple and well-known "twisted nematic" liquid crystal mode may be used. To use this mode, the SLM may be provided with a pair of linear polarisers 43, 44 arranged such that the first and second substrate 25, 26 and the electrooptic layer 24 are disposed between the first polariser 43 and the second polariser 44. In one embodiment, the first linear polariser 43 is arranged such that its transmission axis is perpendicular to the alignment direction on the first substrate 25 of the liquid crystal molecules, as shown in FIG. 5(c). The second polariser 44 is arranged with its transmission axis at 90° to the transmission axis of the first linear polariser 43, as shown in FIG. 5(d). The alignment direction of the liquid crystal molecules on the lower substrate 26 is arranged to be at 90° to the alignment direction on the substrate 25:—so that the alignment direction on the second substrate 26 is parallel to the transmission axis of the lower polariser 44, as shown in FIG. 5(d). This arrangement of the transmission axes of the polarisers and the alignment directions will give a "normally white" mode, in which the SLM will appear maximally transmissive when no voltage is applied across the liquid crystal layer. A region of the SLM is made opaque by applying a suitable voltage across that region of the liquid crystal layer. In this mode, the spacing between the first substrate 25 and the second substrate 26 should be chosen to fulfil the first minimum condition of the liquid crystal mode.

The liquid crystal layer may typically be driven with an alternating current (ac) signal such as, for example, a square wave having a frequency of 200 Hz. Each of the first to eighth sets of electrodes 31-34,39-42 may receive either this drive signal or a zero signal. If the electrodes disposed on either side of a particular one of the addressable regions of the liquid crystal layer receive the same signal type (that is, they either both receive the ac drive signal or they both receive a zero signal), then there is no resultant electric field across the region of the liquid crystal layer and it is not switched and remains maximally transmissive (in the case of a "normally white" mode). On the other hand, if the electrode on one side of a region of the liquid crystal layer receives the ac drive signal and the electrode on the other side of that region receives a zero signal, then there is a resultant electric field across that region of the liquid crystal layer, and that region of the liquid crystal layer is switched and will appear black.

It should be noted that, in the above example, the electrodes that are "off" should be connected to a true zero volt signal, and should not simply be disconnected and allowed to float.

The invention is not, however, limited to this particular drive scheme, and any convenient drive signals may be chosen such that in combination, they produce the correct resultant field required to switch the liquid crystal layer to its black state.

FIG. 4(c) illustrates how an appropriate combination of drive signals applied to the first to eighth electrodes can control which of the first to seventh addressable regions R1-R7 of the liquid crystal layer are transmissive and which are opaque, and hence where is the effective position of the parallax barrier. In the left-hand part of the table, a "1" indicates that a suitable non-zero drive signal is applied to the electrode, and a "0" indicates that a "zero" drive signal is applied to the electrode. In the right-hand part of the table, a "1" indicates that the relevant region of the liquid crystal layer has been switched to give an opaque state, whereas a "0" indicates that the relevant region of the liquid crystal layer has not been switched and so remains maximally transmissive. It can be seen that the drive signals shown in the left-hand part of FIG. 4(c) all provide a parallax barrier in which four of the seven sets of addressable regions R1-R7 are made opaque and the remaining three sets are allowed to be transmissive, so that the transmissive slit of the parallax barrier occupies 3/7 of the pitch of the parallax barrier. By applying the drive signals shown in FIG. 4(c) in sequence, the opaque regions of the parallax barrier can be made to translate laterally across the SLM. The first set of driving signals, for example, in which a non-zero drive signal is applied to the first and third sets of electrodes, and a zero drive signal is applied to all other sets of electrodes, cause the addressable regions R1, R2, R3 and R4 to be driven opaque and the regions R5, R6 and R7 to be driven to be transmissive. The second drive scheme shown in FIG. 4(c), in which a zero drive signal is applied to the fifth and eighth sets of electrodes and a non-zero drive signal is applied to all other sets of electrodes, causes the addressable regions R2-R5 to be driven opaque whereas the regions R6, R7 and R1 are driven to be transparent. As a result, switching from the first driving scheme to the second driving scheme causes the opaque region of the parallax barrier to translate laterally across the SLM, by the width of one addressable region. Switching to the third drive scheme shown in FIG. 4(c) causes the opaque region of the parallax barrier to translate further across the width of the SLM, again by the width of one addressable region, and so on for the remaining drive schemes shown in FIG. 4(c).

It will be noted that the embodiment of FIG. 4(a) requires that one of the first to fourth electrodes has a width that is equal to half the width of the others of the first to fourth electrodes. In the example of FIG. 4(a) each fourth electrode 34 is half the width of the first to third electrodes 31-33.

Similarly, the width of each seventh electrodes 41 is half the width of the fifth, sixth and seventh electrodes 39, 40, 42.

FIG. 4(*d*) is a block schematic diagram illustrating the principle of operation of a multiple view directional display in which an SLM of the invention is used as the parallax barrier. Initially, at step 1 the position of an observer of the display is determined. This may be done, for example by providing the display with a video camera and means (such as the analyser 63 of FIG. 1) for analysing an image from the video camera to detect the position of an observer, for example using the method of European patent application no. 98302989.3.

At step 2, the most appropriate position of the parallax barrier is determined, from the information about the position of the user. By determining the "best position" of the barrier, it is meant that the positions of the opaque regions 14 and transmissive regions 15 of the parallax barrier that provide viewing regions that are appropriate for the observer's position are determined. For example, in the case of a autostereoscopic 3-D display, knowledge about the position of the observer provides knowledge about the position of their eyes, and the "best position" of the parallax barrier is the position of the transmissive regions and opaque regions across the parallax barrier that provides left and right viewing windows that are in coincidence with the determined positions of the observer's left and right eyes respectively.

Step 2 can be conveniently carried out by providing a look-up table that relates the position of the viewing windows 19, 20 of the display to the position of the parallax barrier across the SLM. In this case, step 2 would involve retrieving the best barrier position from the look-up table.

At step 3, the appropriate sets of drive signals are applied to the first to eighth sets of electrodes of the SLM. For example, if it is determined that the best position of the parallax barrier is provided by the final row of the right-hand part of FIG. 4(*c*), the appropriate signal set to apply in step 3 of FIG. 4(*d*) is the signal set shown in the bottom row of the left-hand part of the FIG. 4(*c*). When the appropriate signal set is applied in step 3, the position of the opaque regions and transmissive regions of the parallax barrier are set accordingly at step 4. Step 3 may be carried out by a controller such as the controller 64 of FIG. 1. Step 2 may also be carried out by the controller, or it may be performed by a separate device (not shown in FIG. 1).

In the embodiment of FIG. 4(*a*), the first to seventh addressable regions of liquid crystal material R1-R7 have substantially the same width as one another. The invention is not, however, limited to this, and it is possible for the addressable regions of the liquid crystal material to have different widths from one another. In particular, it may be desirable for the addressable regions corresponding to a pixel set of the image display SLM to be arranged such that addressable regions near the centre of the portion of the parallax barrier corresponding to the pixel set are narrower than the addressable regions at the edges of the portion of the parallax barrier corresponding to the pixel set (in a case where the intended viewing position of the observer is substantially on the axis of the display). This will provide a finer degree of control in tracking the observer when the observer is close to the central position, while providing coarser control over tracking the observer for positions well away from the axis of the display. This may be advantageous when the user is expected to be near the intended viewing position for most of the time. (If the intended viewing position is not on the axis of the display the narrower addressable regions would be off-centre in the portion of the parallax barrier corresponding to the pixel set.)

This is illustrated in FIG. 6(*a*), which is a schematic sectional view through a further SLM of the invention. FIG. 6(*a*) shows the portion of the SLM corresponding to a pixel set of the image display SLM; as in FIG. 4(*b*), the portion of the parallax barrier corresponding to a pixel set contains 7 addressable regions R1-R7 defined in the electrooptic material. In this embodiment, the three addressable regional R3, R4, R5, at or near the centre of the portion of the SLM corresponding to the pixel set are narrower than the regions R1, R2, R6 and R7 towards the edges of the portion. If FIG. 6(*a*) were amended to include addressable regions corresponding to other pixel sets, the addressable regions would have the following repeat structure; R1 wide, R2 wide; R3 narrow, R4 narrow, R5 narrow; R6 wide, R7 wide; R1 wide, R2 wide; R3 narrow, R4 narrow, R5 narrow; R6 wide, R7 wide etc.

In the embodiment of FIG. 6(*a*), the central addressable regions R3, R4, R5 are approximately half the width of the other addressable regions, but the invention is not limited to this precise ratio for the width of the addressable regions. In a preferred embodiment, the width of the addressable regions varies approximately symmetrically about the centre of the portion of the SLM corresponding to a pixel set, as shown in FIG. 6(*a*).

The addressable regions are drawn as not being contiguous with one another in FIG. 6(*a*). However, this embodiment may be applied to an SLM in which each addressable region is contiguous with, or overlaps, neighbouring addressable regions.

Addressable regions of different widths as shown in FIG. 6(*a*) may be obtained by simply varying the width of the electrodes, as shown in FIG. 6(*d*). To obtain addressable regions having the widths indicated in FIG. 6(*a*), in which the central addressable regions R3, R4, R5 have half the width of the other addressable regions, can be achieved by making the width of the first electrodes 31 to be 5P/12, by making the width of the second and third electrodes 32,33 to be P/6, and by making the width of the fourth electrodes 34 to be P/4. In the second electrode arrangement, the width of the fifth electrodes 39 is made P/4, the width of the sixth electrodes 40 is made P/3, the width of the seventh electrodes 41 is made P/12, and the width of the eighth electrodes 42 is made P/3. In contrast, in the embodiment of FIG. 4(*a*) all electrodes have a width of 2P/7, except for the fourth and seventh electrodes 34,41, which each have a width of P/7. P is the pitch of the parallax barrier.

It will be seen that that the mark: space ratio of the parallax barrier will vary in the embodiment of FIG. 6(*a*), depending on which three regions are selected to be transmissive. In applications where it is desired to maintain a constant mark: space ratio it is therefore necessary only to use barrier configurations with the same mark: space ratio as one another, and this will restrict the number of lateral barrier positions that can be used. For example, in FIG. 6(*a*) by using only those barrier configurations in which two narrow regions and one wide region are transmissive, and three wide regions and one narrow region are opaque, it is possible to obtain a constant mark: space ratio.

In the embodiment of FIG. 4(*a*), each of the first and second electrode arrangements included two electrode layers. The invention is not, however, limited to this and one or both of the electrode arrangements may include three (or possibly more) electrode layers. FIG. 6(*c*) shows a further embodiment of the invention, in which each electrode arrangement comprises three electrode layers. The first electrode arrangement 27 on the first substrate 25 includes three electrode layers 45,46,47. Each of the electrode layers 45,46,47 is patterned to define electrodes. The first electrode layer 45 is patterned to define one set of electrodes 45A. The second set of electrodes 46 is patterned to define two sets of electrodes 46A, 46B and the third electrode layer 47 is patterned to define two sets of electrodes 47A, 47B. The two sets of electrodes 46A, 46B defined in the second electrode layer 46 are interdigitated with one another and are addressable independently of one another in the manner shown, for example, FIG. 5(*b*) and the two sets of electrodes 47A, 47B defined in the third electrode layer 47 are interdigitated with one another and are addressable independently of one another in the manner shown in FIG. 5(*b*). Thus, the first electrode arrangement 27 requires five electrical connections. Each of the electrodes 45A, 46A, 46B, 47A, 47B is in the form of a stripe electrode, extending into the plane of the paper in FIG. 6(*c*). The electrodes have the same width as one another, and this width is equal to P/5 where P is the pitch of the parallax barrier. The electrodes are arranged such that each electrode is contiguous with its neighbouring electrodes. Electrically insulating layers 30 are provided between the first and second electrode layers and between the second and third electrode layers.

The second electrode arrangement disposed on the second substrate 26 comprises three electrode layers, 48, 49 and 50. Each of the fourth, fifth and sixth electrode layers is patterned to define electrodes.

The fourth electrode layer 48 is patterned to define two sets of electrodes 48A, 48B. The fifth set of electrodes 49 is patterned to define two sets of electrodes 49A, 49B and the sixth electrode layer 50 is patterned to define two sets of electrodes 50A, 50B. The two sets of electrodes 48A, 48B defined in the fourth electrode layer 48 are interdigitated with one another and are addressable independently of one another. The two sets of electrodes 49A, 49B defined in the fifth electrode layer 49 are arranged in interdigitated groups and are addressable independently of one another, and the two sets of electrodes 50A, SOB defined in the sixth electrode layer 509 are arranged in interdigitated groups and are addressable independently of one another. Thus, the second electrode arrangement 35 requires sixth electrical connections. Each of the electrodes 48A, 48B, 49A, 49B, 50A, 50B is in the form of a stripe electrode, extending into the plane of the paper in FIG. 6(*c*).

The electrodes 48A,48B of the fourth electrode layer each have a width of P/4. They are not evenly spaced, and have separations of P/10 and 8P/20.

The electrodes 49A,49B of the fifth electrode layer each have a width of P/20. They are not evenly spaced, and one set of electrode 49A contains twice as many electrodes as the other set 49B of electrodes. That is, a group of two electrodes of the one set of electrode 49A is interdigitated with one electrode of the other set 49B. Two electrodes of the one set 49A of electrodes are spaced apart by 8P/20, with an electrode of the second set 49B interposed therebetween (spaced 6P/20 and P/20 from the two electrodes 49A).

One set of electrodes 50A of the sixth electrode layer each have a width of P/20, whereas the other set of electrodes 50B of the sixth electrode layer each have a width of P/4. They are not evenly spaced, and one set of electrode 50A contains twice as many electrodes as the other set 50B of electrodes. That is, a group of two electrodes of the one set of electrode 50A is interdigitated with one electrode of the other set 50B. The two electrodes of a group of the one set 49A are spaced apart by 6P/20, with an electrode of the second set 50B being spaced-a further P/20 along.

The electrodes are arranged such that each electrode is contiguous with its neighbouring electrodes. Electrically insulating layers 38 are provided between the first and second electrode layers and between the second and third electrode layers.

The second electrode arrangement 35 of FIG. 6(*c*) requires six electrical connections, two for each of the electrode layers.

FIG. 6(*b*) shows the addressable regions obtained by the electrode arrangements of FIG. 6(*c*). FIG. 6(*b*) shows the addressable regions corresponding to one pixel set of the image display SLM. The portion of the parallax barrier corresponding to a pixel set contains 10 addressable regions R1-R10 defined in the electrooptic material. In this embodiment, the six addressable regional R3, R4, R5, R6, R7, R8 at or near the centre of the portion of the SLM corresponding to the pixel set are narrower than the regions R1, R2, R9 and R10 towards the edges of the portion. In the embodiment of FIG. 6(*b*), the central addressable regions R3 to R8 are approximately half the width of the other addressable regions, but the invention is not limited to this precise ratio for the width of the addressable regions.

The electrode arrangements of the present invention may be manufactured by any suitable technique. To manufacture the upper electrode arrangement 27 of FIG. 4(*a*), for example, the surface of the upper substrate 25 would initially be cleaned and prepared, and an electrically conducting layer would then be deposited over the surface. The layer my be a layer of, for example, Indium Tin Oxide or another transparent, electrically conductive material. This layer is then patterned using any suitable technique to define the first and second sets of electrodes 31, 32. For example, the layer may be patterned by depositing a photoresist over the entire surface of the layer, masking the photoresist with a mask corresponding to the shape of the desired electrodes, and exposing the photo resist through the mask to remove photo resist from the irradiated regions. The areas of the electrically conductive layer that are exposed may then be removed using any suitable etching technique, leaving the desired sets of electrodes. The remaining portions of the photo resist may then be removed.

An insulating layer is then deposited over the first and second sets of electrodes 31, 32.

A further conductive layer is then deposited over the insulating layer, and this layer is patterned as described above in order to form third and fourth set of electrodes 33, 34.

The insulating layer 30 may constitute any suitable material which can easily be formed on top of the first electrically conductive layer and that has appropriate electrical insulating properties. For example, the insulating layer may constitute a polymeric material that can be coated on the substrate by printing or spin-coating. Alternatively, it may be a solution of a silicon oxide material. Further, the insulating layer may be a material such as silicon oxide or silicon nitride which is applied by a sputtering or vacuum deposition technique, for example plasma enhanced chemical vapour deposition.

If desired, the material for the insulating layers 30 may be chosen such that the insulating layers will perform a further function in additional to providing electrical isolation. For example, if the electrically insulating layers 30 are formed of a liquid crystal polymer, they will further constitute an optical retarder layer and so will vary the optical properties of the SLM.

The first electrode layer 28 will typically be thin (typically with a thickness of around 100 nm), and it is therefore not normally necessary to planarise the first electrode layer after it has been etched to form the electrode. Moreover, the insulating layer 30 will act as a planarising layer.

Figure 7:
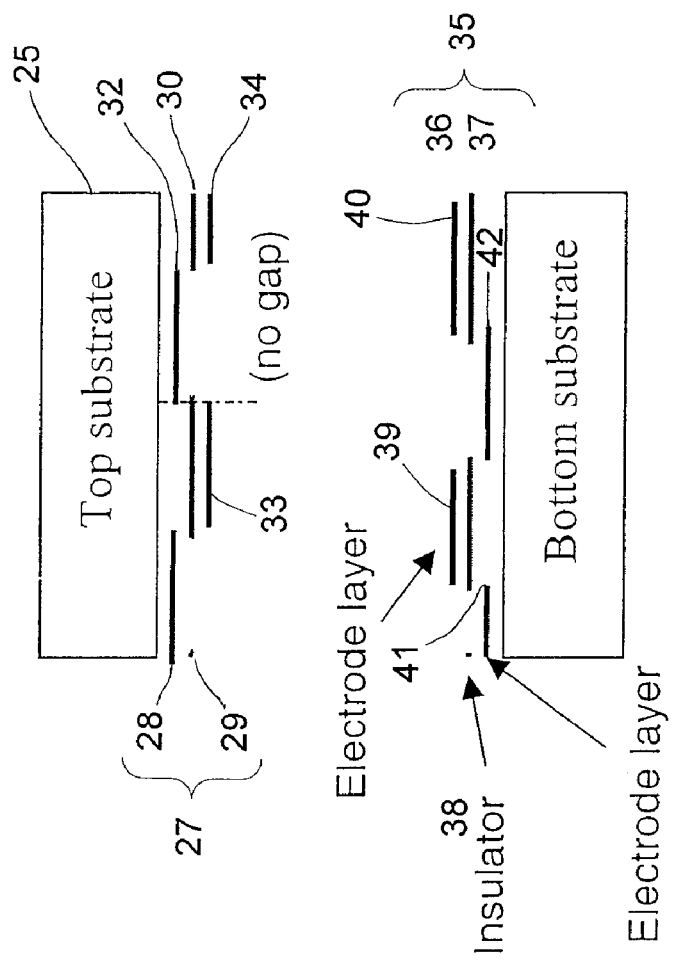
FIG. 7 is a partial cross-section view of a spatial light modulator according to a further embodiment of the present invention.

In the embodiment of FIG. 4(a), the insulating layers 30 extend over the entire area of the SLM. Drive voltages applied to the first or second electrodes 31, 32 and the seventh or eighth electrodes 41, 42 are therefore required to be greater than the drive voltages applied to the third and fourth electrodes 33, 34 or the fifth and sixth electrodes 31, 40, to compensate for the voltage developed across the insulating layers 30. In order to minimise the increase in drive voltage required, it may be desirable to selectively pattern the insulating layers 30, so that they cover only a region close to the edges of the first and second electrodes, or close to the edges of the seventh and eighth electrodes, as shown in FIG. 7. By patterning the electrodes in this way, the majority of the area of the first and second electrodes 31, 32 is not covered by the insulating layer 30.

If desired, the insulating layer 30 on the lower substrate 26 may also be patterned in a similar manner to the insulating layer on the upper substrate 30.

When an SLM of the invention is used to provide the parallax barrier in a multiple view directional display, the invention effectively allows two (or more) parallax barriers to be provided in the display. In the examples described above, the two or more parallax barriers have been identical, or near-identical, to one another, but have had their opaque and transparent regions provided at different lateral positions across the SLM. This allows the parallax barrier to be effectively translated laterally relative to the image display layer, in order to vary the positions of the viewing windows so as to track the movement of an observer. The invention is not, however, limited to this particular application.

Figure 8:
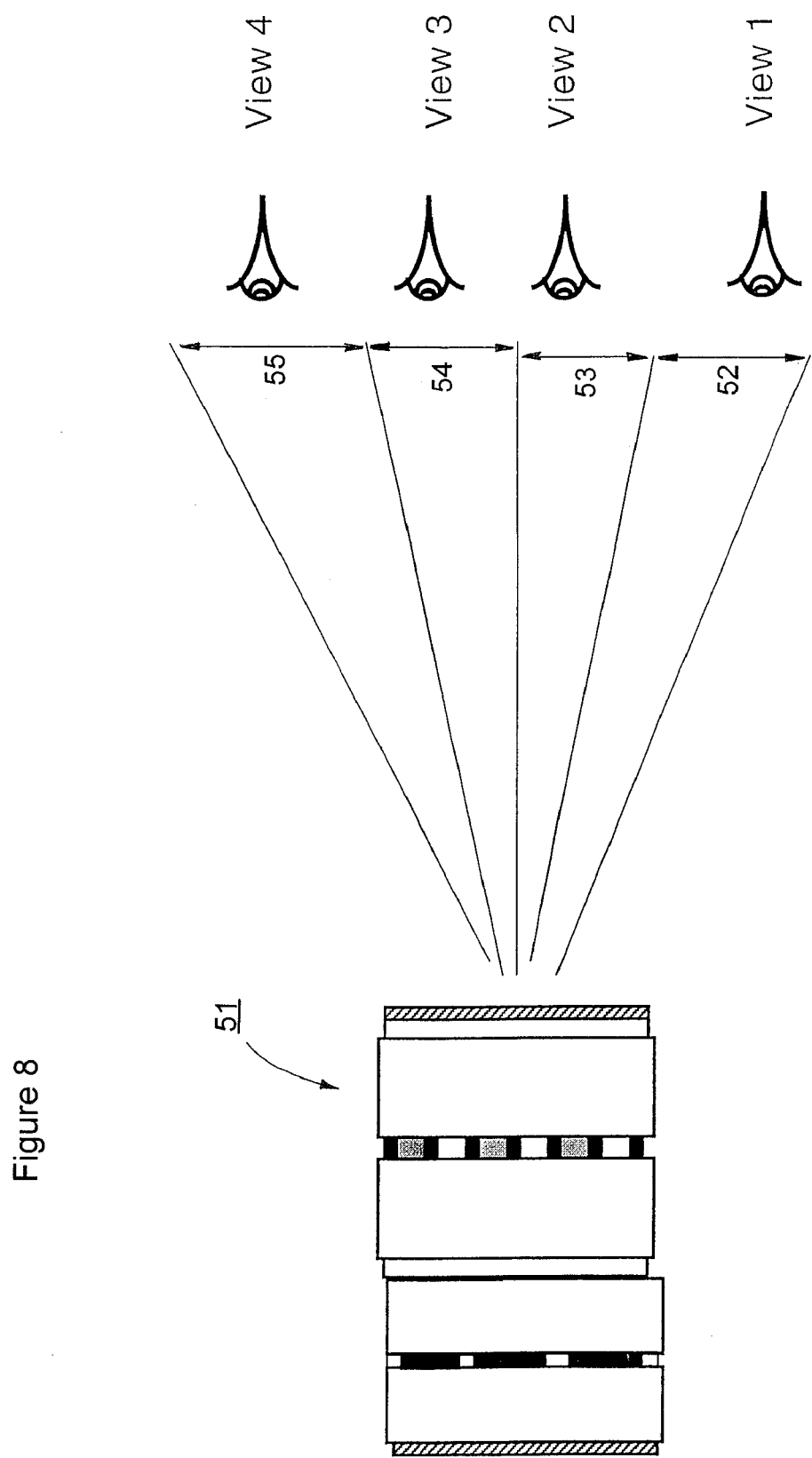
FIG. 8 is a schematic plan view of a multiple view autostereoscopic 3-D display incorporating a spatial light modulator of the present invention.

As an example, a SLM of the invention may be used as a parallax barrier in a display that can provide multiple view 3-D images. FIG. 8 shows a display 51 that can display four different views, with each view being displayed to a respective viewing window 52-55. Providing four different views provides greater viewing freedom and realism, although at the expense of resolution.

In this embodiment the parallax barrier provides two alternative fixed position parallax barriers. The first parallax barrier has a pitch which is roughly twice the pixel pitch i.e. the "pixel set" is two pixels which contain two views. The other parallax barrier has a pitch which is roughly 4 times the pixel pitch, i.e. the "pixel set" is 4 pixels which contain 4 views. A user can select one parallax barrier to get a two-view 3-D display or select the other parallax barrier to get a four-view 3-D display (the disadvantage of the four view mode is that each view has ¼ resolution rather than ½ in the two view case). The four view mode allows 3 different 3-D viewing positions corresponding to viewing windows 52 and 53, to viewing windows 53 and 54, and to viewing windows 54 and 55. This may be used to give "lookaround" viewing. This embodiment does not provide observer tracking.

Figure 9:
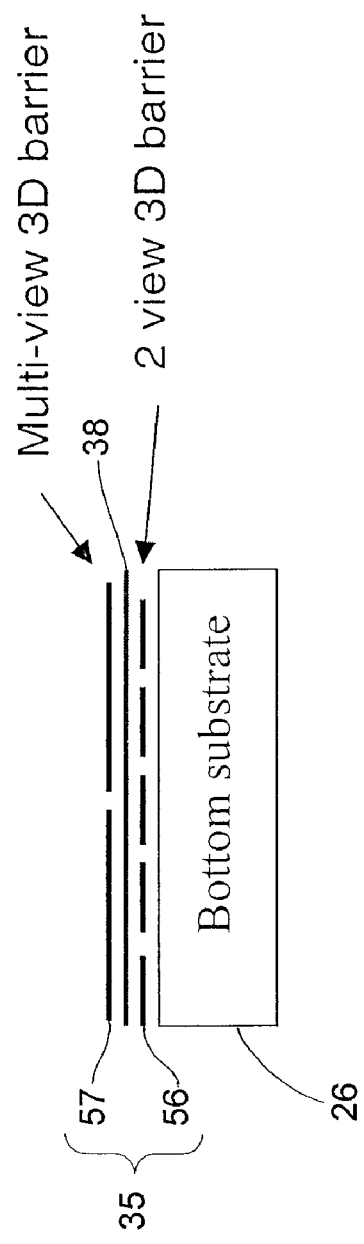
FIG. 9 is a partial cross-section view of a spatial light modulator according to a further embodiment of the present invention.

FIG. 9 illustrative schematically a further application for the present invention. In this embodiment, the SLM of the invention provides two parallax barriers, one of which is suitable for a two-view 3-D autostereoscopic display and the other of which is suitable for a multiple view autostereoscopic 3-D display, of the type shown in FIG. 8. In the example of FIG. 9, one substrate of the SLM is provided with two electrode layers, 57, 56, each of which is patterned to define a plurality of stripe electrodes that extend into the plane of the paper. In FIG. 9 the electrode layers are shown as forming the second electrode arrangement 35 disposed on the second substrate 26, but they could equally well be disposed on the upper substrate 25. One of the electrode layers 56 is patterned to produce electrodes that can define a parallax barrier in the SLM suitable for a two view 3-D display mode, and the other electrode layer 57 is patterned to provide electrodes that can define a parallax barrier in the SLM that is suitable to give a multiple view 3-D display mode. As can be seen, the pitch of the parallax barrier defined in the electrode layer 57 (for the multiple view 3-D display mode) is greater by at least a factor of two than the pitch of the parallax barrier defined in the electrode layer 56 (for the two-view 3-D display mode).

An electrode arrangement is provided on the other substrate 25 (not shown), and this may be a simple counter electrode disposed over the entire area of the other substrate. By applying a suitable drive voltage between the electrodes of the first electrode layer 56 and the counter electrode, a parallax barrier suitable for a two view 3-D display mode may be defined in the SLM, whereas by applying a suitable drive voltage between the second electrode layer 57 and the counter electrode a parallax barrier suitable for a multiple view 3-D display mode may be defined in the SLM. Using an SLM of the invention as the parallax barrier in an autostereoscopic 3-D display thus allows the display to be switched easily between a two view 3-D display mode and a multiple view 3-D display mode, by driving the SLM to produce the appropriate parallax barrier (and by addressing the display layer accordingly).

A further known application of a multiple view directional display is, as explained above, a "dual view" display which displays two (or more) independent images in different directions for viewing by respective users. FIG. 10 is a schematic plan view of a dual view display 58 which can display a first image to a user in a first viewing window 59 and display a second, independent image to a second user in a second viewing window 60. A dual view display in similar in principle to a autostereoscopic 3-D display, except that the width, at the intended viewing distance, of a viewing window 59, 60 of a dual view display is greater than the width, at the intended viewing distance, of a viewing window of a 3-D display. In order to switch a multiple view display from a dual view display mode to a 3-D autostereoscopic display mode, it is required to re-configure the parallax barrier to provide the appropriate sized viewing window. A SLM of the invention may be used to provide the parallax barrier in a display that can be reconfigured between a dual view display mode and an autostereoscopic 3-D display mode. A suitable SLM will be similar in principle to the SLM of the FIG. 9, except that one electrode layer would be patterned to produce electrodes that would define a parallax barrier for a dual view display mode and a second electrode layer would be patterned to provide electrodes that define a parallax barrier for autostereoscopic 3-D display mode.

The invention claimed is:

1. A spatial light modulator comprising: a first substrate; a second substrate; a layer of electrooptic material disposed between the first substrate and the second substrate; a first electrode arrangement disposed over the first substrate; and a second electrode arrangement disposed over the second substrate;

wherein the first electrode arrangement comprises first and second electrode layers disposed over the first substrate, the spacing between the first electrode layer and the first substrate being different to the spacing between the second electrode layer and the first substrate;

the first electrode layer and the second electrode arrangement are configured so as to co-operate, in use, to define a plurality of first addressable regions in the electrooptic material;

the second electrode layer and the second electrode arrangement are configured so as to co-operate, in use, to define a plurality of second addressable regions in the electrooptic material;

the first electrode layer comprises a set of first electrodes and a set of second electrodes, the set of first electrodes being addressable independently of the set of second electrodes; and the first electrodes are interdigitated with the second electrodes.

2. A modulator as claimed in claim 1 wherein the second electrode layer comprises a set of third electrodes and a set of fourth electrodes, the set of third electrodes being addressable independently of the set of fourth electrodes.

3. A modulator as claimed in claim 2 wherein the third electrodes are interdigitated with the fourth electrodes.

4. A modulator as claimed in claim 3, wherein the first electrode layer comprises a set of first electrodes and a set of second electrodes, and wherein a third electrode is at least contiguous with a gap between a first electrode and a second electrode.

5. A modulator as claimed in claim 3, wherein the first electrode layer comprises a set of first electrodes and a set of second electrodes, and wherein a fourth electrode of the fourth set is at least contiguous with a gap between a first electrode and a second electrode.

6. A modulator as claimed in claim 2 wherein an electrode of the third set has a width substantially equal to half the width of an electrode of the fourth set.

7. A modulator as claimed in claim 1, wherein the second electrode layer comprises a set of third electrodes and a set of fourth electrodes, and wherein a first electrode is at least contiguous with a gap between a third electrode and a fourth electrode.

8. A modulator as claimed in claim 1, wherein the second electrode layer comprises a set of third electrodes and a set of fourth electrodes, and wherein a second electrode is at least contiguous with a gap between a third electrode and a fourth electrode.

9. A modulator as claimed in claim 1, wherein an electrode of the first set has a width substantially equal to the width of an electrode of the second set.

10. A modulator as claimed in claim 1 wherein each second addressable region is at least contiguous with a respective first addressable region.

11. A modulator as claimed in claim 1 wherein each second addressable region overlaps a respective first addressable region.

12. A modulator as claimed in claim 1 wherein the first and second electrode arrangements are configured so as to further define a plurality of third addressable regions in the electrooptic material, each third addressable region being at least contiguous with a respective second addressable region.

13. A modulator as claimed in claim 12 wherein the first and second electrode arrangements are configured so as to further define a plurality of fourth addressable regions in the electrooptic material, each fourth addressable region being at least contiguous with a respective third addressable region.

14. A modulator as claimed in claim 13 wherein the width of a region selected from the group consisting of the third addressable regions and the fourth addressable regions is dependent upon the lateral position of the addressable region.

15. A modulator as claimed in claim 1 wherein the second electrode arrangement comprises third and fourth electrode layers disposed over the second substrate, the spacing between the third electrode layer and the second substrate being different to the spacing between the fourth electrode layer and the second substrate.

16. A modulator as claimed in claim 15 wherein the third electrode layer comprises a set of fifth electrodes and a set of sixth electrodes, the set of fifth electrodes being addressable independently of the set of sixth electrodes.

17. A modulator as claimed in claim 16 wherein the fifth electrodes are interdigitated with the sixth electrodes.

18. A modulator as claimed in claim 15 wherein the fourth electrode layer comprises a set of seventh electrodes and a set of eighth electrodes, the set of seventh electrodes being addressable independently of the set of eighth electrodes.

19. A modulator as claimed in claim 18 wherein the seventh electrodes are interdigitated with the eighth electrodes.

20. A modulator as claimed in claim 1 wherein the electrooptic layer is a layer of liquid crystal material.

21. A multiple view directional display comprising an image display layer; a spatial light modulator disposed in the path of light through the image display layer; and means for addressing the spatial light modulator to define a parallax barrier; wherein the spatial light modulator is a modulator as defined in claim 1.

22. A multiple view directional display as claimed in claim 21, wherein the display is a dual view display.

23. A multiple view directional display as claimed in claim 21, wherein the display is an autostereoscopic 3-D display.

24. A multiple view directional display as claimed in claim 23 wherein the display further comprises: position determining means for determining the position of an observer; and a controller for controlling the spatial light modulator in accordance with a determined position of the observer.

25. A multiple view directional display as claimed in claim 21, wherein the width of an addressable region nearer the lateral center of the portion of the layer of electrooptic material corresponding to a pixel set is less than the width of an addressable region further from the lateral center of the portion of the layer of electrooptic material corresponding to the pixel set.

* * * * *